(12) United States Patent
Suzuki et al.

(10) Patent No.: US 11,571,099 B2
(45) Date of Patent: Feb. 7, 2023

(54) INTERLOCKING ADAPTER, AND METHOD FOR OPERATING ELECTRIC APPARATUS IN INTERLOCKING MANNER WITH WORKING MACHINE

(71) Applicant: MAKITA CORPORATION, Anjo (JP)

(72) Inventors: Hitoshi Suzuki, Anjo (JP); Yuki Kawai, Anjo (JP); Itsuku Kato, Anjo (JP); Yasutaka Hotta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 135 days.

(21) Appl. No.: 17/130,964

(22) Filed: Dec. 22, 2020

(65) Prior Publication Data
US 2021/0106194 A1  Apr. 15, 2021

Related U.S. Application Data

(63) Continuation of application No. 16/232,827, filed on Dec. 26, 2018, now Pat. No. 10,898,041.

(30) Foreign Application Priority Data

Dec. 28, 2017 (JP) .............................. JP2017-253964
Mar. 16, 2018 (JP) .............................. JP2018-049556

(51) Int. Cl.
*H02M 1/08* (2006.01)
*A47L 7/00* (2006.01)
(Continued)

(52) U.S. Cl.
CPC ........... *A47L 7/0095* (2013.01); *A47L 9/2868* (2013.01); *G05F 1/445* (2013.01); *H02M 1/082* (2013.01)

(58) Field of Classification Search
CPC ................. H02M 1/081; H02M 1/082; H02M 2001/0035; H02M 1/042; H02M 1/083;
(Continued)

(56) References Cited

U.S. PATENT DOCUMENTS 4,358,730 A  11/1982 Beifus
5,955,791 A  9/1999 Irlander
(Continued)

FOREIGN PATENT DOCUMENTS

EP  2284638 A2 *  2/2011 ............. G05F 1/613
EP  3041129 A1  7/2016
(Continued)

OTHER PUBLICATIONS

May 28, 2019 extended Search Report issued in European Patent Application No. 18215561.4.
(Continued)

*Primary Examiner* — Harry R Behm
(74) *Attorney, Agent, or Firm* — Oliff PLC

(57) ABSTRACT

An interlocking adapter in one aspect of the present disclosure includes a current path, an electric load, a switch, and a controller. The controller turns on and off the switch in synchronization with a change of an alternating-current voltage received from an electric outlet of an electric apparatus in response to reception of an interlocking command signal from a working machine so as to supply a load current from the electric outlet to the electric load. The controller turns on and off the switch at a specified ratio of a time every ½ cycle of the alternating-current voltage.

16 Claims, 24 Drawing Sheets

(51) Int. Cl.
*A47L 9/28* (2006.01)
*G05F 1/445* (2006.01)

(58) Field of Classification Search
CPC .......... G05F 1/445; G05F 1/452; G05F 1/455; A47L 7/0095; A47L 9/2868
See application file for complete search history.

(56) References Cited

U.S. PATENT DOCUMENTS

| | | | |
|---|---|---|---|
| 6,044,519 A | 4/2000 | Hendrix | |
| 6,061,259 A | 5/2000 | DeMichele | |
| 6,067,583 A | 5/2000 | Gilbert | |
| 2004/0060145 A1 | 4/2004 | Hayama et al. | |
| 2006/0087286 A1 | 4/2006 | Phillips et al. | |
| 2006/0227884 A1 | 10/2006 | Koga et al. | |
| 2007/0291517 A1 | 12/2007 | Xiao et al. | |
| 2008/0022479 A1 | 1/2008 | Zhao | |
| 2008/0252370 A1* | 10/2008 | Mun | H03F 1/307 330/9 |
| 2009/0241283 A1 | 10/2009 | Loveless et al. | |
| 2012/0073077 A1 | 3/2012 | Ishikawa et al. | |
| 2014/0269952 A1 | 9/2014 | Katar et al. | |
| 2014/0304939 A1 | 10/2014 | Suzuki | |
| 2015/0047866 A1 | 2/2015 | Sakai et al. | |
| 2016/0100724 A1 | 4/2016 | Valentini | |
| 2016/0190960 A1 | 6/2016 | Kawai et al. | |
| 2018/0112837 A1* | 4/2018 | Sadwick | H05B 45/3725 |
| 2018/0192490 A1 | 7/2018 | Gotou et al. | |
| 2019/0030669 A1 | 1/2019 | Wu | |
| 2020/0100638 A1 | 4/2020 | Caspar | |
| 2021/0100417 A1* | 4/2021 | Tauber | G08C 17/02 |

FOREIGN PATENT DOCUMENTS

| | | |
|---|---|---|
| GB | 1583370 A | 1/1981 |
| JP | 2008-036723 A | 2/2008 |
| JP | 4955332 B2 | 6/2012 |
| JP | 5547693 B2 | 7/2014 |
| JP | 2017-213680 A | 12/2017 |
| WO | 2013147324 A2 | 10/2013 |

OTHER PUBLICATIONS

Apr. 14, 2021 Office Action issued in Chinese Patent Application No. 201811626503.4.

* cited by examiner

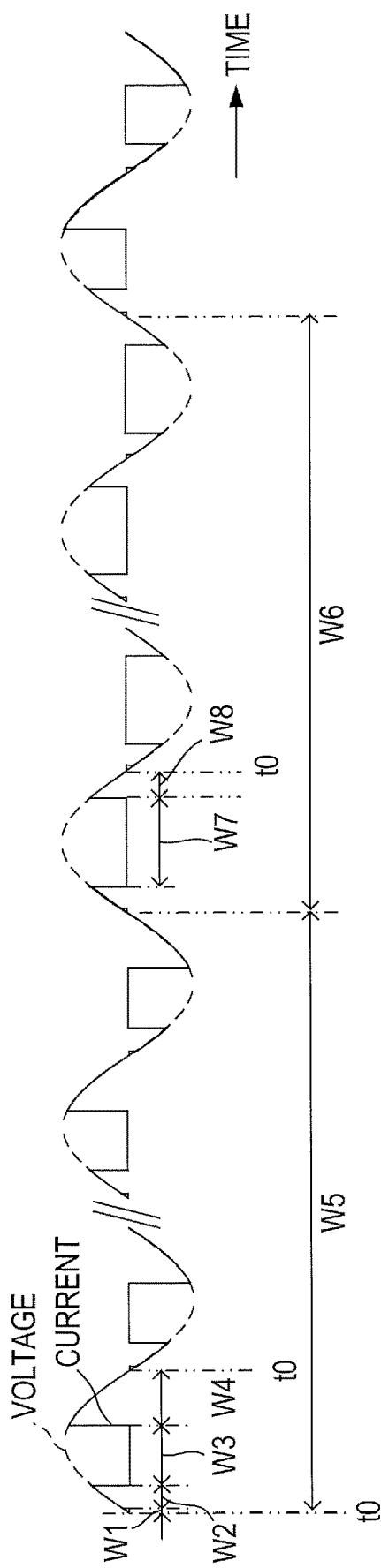

| SETTING DATA | |
|---|---|
| W1 (FIRST HALF CONDUCTION OFF-PERIOD) | 0.1ms |
| W2 (FIRST HALF CONDUCTION ON-PERIOD) | 2ms |
| W3 (SECOND HALF HIGH CURRENT CONDUCTION OFF-PERIOD) | 3.9ms |
| W4 (SECOND HALF HIGH CURRENT CONDUCTION ON-PERIOD) | 4ms |
| W5 (HIGH CURRENT CONDUCTION REPETITION PERIOD) | 1.2sec |
| W6 (SMALL CURRENT CONDUCTION REPETITION PERIOD) | 6.8sec |
| W7 (SECOND HALF SMALL CURRENT CONDUCTION OFF-PERIOD) | 5.9ms |
| W8 (SECOND HALF SMALL CURRENT CONDUCTION ON-PERIOD) | 2ms |

FIG. 5

INTERLOCKING ADAPTER, AND METHOD FOR OPERATING ELECTRIC APPARATUS IN INTERLOCKING MANNER WITH WORKING MACHINE

CROSS-REFERENCE TO RELATED APPLICATIONS

This is a Continuation of application Ser. No. 16/232,827 filed Dec. 26, 2018, which in turn claims the benefit of Japanese Patent Application No. 2017-253964 filed on Dec. 28, 2017 and No. 2018-049556 filed on Mar. 16, 2018 with the Japan Patent Office, the entire disclosures of which are incorporated herein by reference.

BACKGROUND

The present disclosure relates to a technique for operating an electric apparatus in an interlocking manner with a working machine.

Japanese Patent No. 4955332 discloses an interlocking adapter configured to be attached to an electric outlet provided in a dust collector.

The interlocking adapter is configured to supply electric current to a resistor in the interlocking adapter from the electric outlet, in response to reception of an interlocking operation command transmitted from an electric power tool by a receiver of the interlocking adapter.

The interlocking adapter allows interlocking operation of the dust collector with the electric power tool without supply of an alternating current (AC) voltage from the dust collector to the electric power tool, and also eliminates wiring between the dust collector and the electric power tool.

The interlocking adapter further allows interlocking operation of an electric apparatus, such as a dust collector, with not only an AC-driven working machine, such as an electric power tool operated by an AC voltage, but also a battery-driven working machine.

SUMMARY

In this interlocking adapter, in order to cause the electric apparatus to operate in an interlocking manner with the working machine, it is necessary to supply a load current, with which the electric apparatus can detect operation of the working machine, from the electric outlet of the electric apparatus to an electric load such as a resistor, during a working period of the working machine, as mentioned above.

Therefore, the interlocking adapter has to use an electric load which can be continuously supplied with a load current equivalent to the electric current that flows during the operation of the working machine, resulting in upsizing of the interlocking adapter.

The electric load requires heat dissipation measures by means of a heat sink and the like, since heat is generated due to flow of the electric current through the electric load. Such heat dissipation measures lead to upsizing of the interlocking adapter. The load current supplied to the electric load is wasted.

In one aspect of the present disclosure, it is desirable to be able to reduce power consumption of an interlocking adapter, and downsize the interlocking adapter.

An interlocking adapter in one aspect of the present disclosure includes a current path, an electric load, a switch, and a controller. The current path supplies a load current based on an alternating-current voltage received from an electric outlet provided in an electric apparatus. The electric load is provided in the current path. The switch is provided in the current path, and turned on and off. The current path is completed in response to the switch being turned on. The current path is interrupted in response to the switch being turned off. The controller, in response to reception of an interlocking command signal from a working machine, turns on and off the switch in synchronization with a change of the alternating-current voltage so as to supply the load current from the electric outlet to the electric load. The controller turns on and off the switch at a specified ratio of a time every ½ cycle of the alternating-current voltage.

In the interlocking adapter as such, upon causing the electric apparatus to operate in an interlocking manner with the working machine in response to reception of the interlocking command signal, the switch is not merely turned on to supply the load current to the electric load, but is turned on and off at a specified ratio of a time every ½ cycle of the alternating-current voltage.

Therefore, as compared to the aforementioned interlocking adapter disclosed in Japanese Patent No. 4955332, the interlocking adapter in the one aspect of the present disclosure can reduce an amount of the load current (in other words, effective current) supplied to the electric load in order to cause the electric apparatus operate in an interlocking manner with the working machine, and reduce power consumption. Also, since the effective current supplied to the electric load can be reduced, the interlocking adapter in the one aspect of the present disclosure can reduce an amount of heat generation of the electric load, and can be downsized.

The working machine and/or the electric apparatus may be a job-site device for performing a physical task.

An on-period during which the switch is turned on in order to cause the electric apparatus in an interlocking manner with the working machine may be associated with a detection characteristic of the load current used to determine whether the electric apparatus operates in an interlocking manner with the working machine.

For example, in case that the electric apparatus is configured to determine whether to start interlocking operation with the working machine based on the load current supplied after a zero-cross point of the alternating-current voltage, the controller may turn on the switch only for a certain period after the zero-cross point every ½ cycle of the alternating-current voltage.

For example, in case that the electric apparatus is configured to determine whether to start interlocking operation with the working machine based on the load current supplied before the zero-cross point of the alternating-current voltage, the controller may turn on the switch only for a certain period before the zero-cross point every ½ cycle of the alternating-current voltage.

The controller may turn on and off the switch so that the switch is turned on once for a specified period within the ½ cycle of the alternating-current voltage.

The controller may turn on and off the switch so that the switch is turned on at least twice for a specified period within the ½ cycle of the alternating-current voltage.

In this case, usability of the interlocking adapter can be improved. In other words, a user of the interlocking adapter can use the interlocking adapter to cause a different type of electric apparatus to operate in an interlocking manner with the working machine.

The electric apparatus can be configured to continue operating of the electric apparatus for a certain period even if supply of the load current is no longer detected once the electric apparatus detects that the load current is supplied from the electric outlet and starts interlocking operation with the working machine.

For example, a dust collector, which is one example of the electric apparatus, can be configured to continue operating the dust collector for a certain period and suck dust around the dust collector, even after operation of the working machine stops.

In case that the electric apparatus is configured as above, the controller may supply the load current to the electric load in accordance with an operation characteristic of the electric apparatus.

In other words, in this case, the controller, in response to reception of the interlocking command signal, may alternately execute a conduction implementation control and a conduction stop control so as to temporarily stop supply of the load current within a certain period during which the electric apparatus and the working machine continue interlocking operation with each other after the electric apparatus can no longer detect the supply of the load current.

The interlocking adapter as such can further reduce the amount of the load current (effective current) supplied to the electric load, can reduce the amount of heat generation accompanying the supply of the load current, and can be further downsized.

The controller executing the conduction implementation control may turn on and off the switch for 1 cycle of the alternating-current voltage or a specified control period which is longer than the 1 cycle so as to supply the load current from the electric outlet to the electric load. The controller executing the conduction stop control may turn off the switch for 1 cycle of the alternating-current voltage or a specified stop period which is longer than the 1 cycle so as to stop the supply of the load current.

The controller, may select one of control patterns in accordance with a selection command received by the controller. The control patterns may be different from each other in a ratio between an on-period of the switch and an off-period of the switch.

In other words, the different type of electric apparatus can have a different detection characteristic of the load current used for determining whether to operate in an interlocking manner with the working machine. The aforementioned controller can select one of the control patterns in accordance with the type of the electric apparatus.

Use of the interlocking adapter as such allows the user to cause at least two different types of electric apparatuses to operate in an interlocking manner with the working machine. Also, in this case, since the controller can change the ratio of the time to turn on and off the switch in accordance with the type of the electric apparatus, it is possible to minimize the amount of the load current supplied to the electric load in order to cause the electric apparatus to operate in an interlocking manner with the working machine and downsize the interlocking adapter.

The controller intermittently supplies the load current to the electric load by turning on and off the switch. The electric apparatus, based on the load current, determines whether to operate in an interlocking manner with the working machine.

The controller may accurately control the on-period and an off-period of the switch. In this case, the switch may include a semiconductor device such as, for example, a field effect transistor (FET) and an insulated gate bipolar transistor (IGBT) that can be turned on and off at a desired timing.

The interlocking adapter may further include a full-wave rectifier configured to rectify full wave of the alternating-current voltage and generate a rectified voltage.

In this case, the switch is turned on and off at a desired timing, so that the load current can be supplied from the electric outlet to the electric load. As a result, the electric apparatus can determine whether to operate in an interlocking manner with the working machine based on the load current.

The full-wave rectifier may include an input stage, and receive the alternating-current voltage at the input stage. The current path may be coupled to the input stage. The full-wave rectifier may include an output stage, and be configured to output the rectified voltage from the output stage. The current path may be coupled to the output stage.

A load characteristic (such as a resistance value) of the electric load may be set such that a value of the load current supplied during the on-period during which the controller turns on the switch is equal to or greater than a current value for determining implementation of interlocking operation with the working machine by the electric apparatus.

The load current supplied to the electric load during the on-period of the switch can be determined from a value of the alternating-current voltage supplied from the electric outlet when the switch is on and the load characteristic of the electric load. In other words, when the value of the alternating-current voltage is low, the load current can be reduced.

The interlocking adapter may include a voltage detector configured to detect the value of the alternating-current voltage. The controller may adjust the ratio of the time, based on the value of the alternating-current voltage detected by the voltage detector. The controller may adjust the ratio of the time so that the lower the value detected by the voltage detector is, the longer the switch is on.

In this case, without being influenced by fluctuation of the alternating-current voltage supplied from the electric outlet, it is possible to control a magnitude of the load current supplied to the electric load during the on-period of the switch to a desired magnitude of the load current which allows determination on whether to implement interlocking operation with the working machine by the electric apparatus. Thus, it is possible to cause the electric apparatus to operate in an interlocking manner, in conjunction with operation of the working machine more reliably.

The electric load may include a resistive load. The interlocking adapter may include a fan configured to cool the resistive load.

The controller may drive the fan in synchronization with the interlocking command signal.

The controller may stop the supply of the load current to the electric load in response to stop of reception of the interlocking command signal.

The controller may stop driving of the fan in response to elapse of a specified cooling time after stopping the supply of the load current. In this case, even after the supply of the load current to the electric load is stopped, it is possible to continue cooling of the electric load and inhibit an increase in temperature of the interlocking adapter.

The interlocking adapter may include a temperature detector configured to detect a temperature of the electric load.

The controller may continue driving of the fan in response to the temperature, which is detected by the temperature detector, being equal to or higher than a specified temperature after the supply of the load current is stopped. In this case, it is possible to inhibit an increase in temperature of the interlocking adapter due to heat generation of the electric load after the supply of the load current to the electric load is stopped.

The controller may determine whether the fan is normally (or properly) rotating during the supply of the load current to the electric load. The controller may stop the supply of the load current to the electric load in response to determination by the controller that the fan is not normally rotating.

In this case, it is possible to inhibit excessive heat generation of the electric load due to failure of the fan to cool the electric load during the supply of the load current to the electric load.

When the supply of the load current to the electric load is forcibly stopped due to failure of the fan, it is not possible to cause the electric apparatus to operate in an interlocking manner with the working machine.

The interlocking adapter may be configured to perform error display when the supply of the load current to the electric load is forcibly stopped. In this case, it is possible to notify the user that a reason why the electric apparatus cannot operate in an interlocking manner with the working machine is due to failure of the interlocking adapter.

The interlocking adapter may include a housing including a first outer wall surface. The interlocking adapter may include a power cord coupled to the electric outlet. The fan may be housed in the housing together with the electric apparatus. The first outer wall surface may include a first opening provided to suck an air into the housing or discharge the air from the housing. The first outer wall surface may include an insertion hole provided to insert the power cord into the housing. The power cord may be drawn out from the insertion hole to outside of the housing.

In this case, it is possible to inhibit or restrict the power cord from closing the first opening. Therefore, it is possible to secure a suction path of the air from the first opening or a discharge path of the air to the first opening, and cool the electric load by rotation of the fan.

In case that the fan is arranged near the first opening, a forced air flow can be generated through the first opening which is not to be closed. Therefore, the electric load can be more effectively cooled.

The housing may include a second outer wall surface. The second outer wall surface may include a second opening provided to suck an air into the housing or discharge the air from the housing.

The housing may include a third outer wall surface. The third outer wall surface may include a third opening provided to suck an air into the housing or discharge the air from the housing.

In this case, a passage of the air can be formed by the second opening and the third opening, in addition to the first opening. Further, even if any one of the first opening, the second opening and the third opening is closed, the passage of the air can be secured. Thus, cooling effect of the electric load by rotation of the fan can be sufficiently exerted.

The first opening, the second opening and the third opening may be arranged so as to face the electric load. The fan may be arranged between one of the first opening, the second opening and the third opening, and the electric load.

In this case, it is possible to concentrate an air flow generated by rotation of the fan on the electric load and inhibit heat from the electric load from flowing into other portion in the housing, thereby inhibiting an increase in temperature of the interlocking adapter.

The interlocking adapter may be configured to notify the user of the control pattern selected by the controller.

This notification may be performed, for example, by lighting of a LED, image display or the like. The housing may include an operating device that receives the selection command from the user. An indicator that makes the aforementioned notification may be arranged so as to avoid being covered by a hand of the user operating the operating device. Even when the error display is performed due to failure of the fan or the like, the indicator may avoid being covered by the hand of the user.

When the indicator for displaying an operation state such as the selected control pattern, an error, etc. is provided in the interlocking adapter, the indicator and the operating device may be provided on the same outer wall surface of the housing. The indicator may be arranged at an outer side of the housing than the operating device (in other words, a corner portion).

In the arrangement as above, when the user is operating the operating device while holding the housing with the hand, it is possible for the indicator arranged at the outer side of the housing to avoid being covered by the hand of the user. Therefore, the user can check the indicator while operating the operating device.

Another aspect of the present disclosure is a method for operating an electric apparatus in an interlocking manner with a working machine. The method includes: receiving an alternating-current voltage supplied from an electric outlet provided in an electric apparatus by an interlocking adapter; wirelessly receiving an interlocking command wirelessly transmitted from a working machine by the interlocking adapter; and turning on and off a switch in the interlocking adapter in synchronization with a change of the alternating-current voltage in response to wireless reception of the interlocking command by the interlocking adapter so as to supply a load current from the electric outlet to an electric load in the interlocking adapter, the switch and the electric load being provided in a path of the load current in the interlocking adapter, the switch being turned on and off at a specified ratio of a time every ½ cycle of the alternating-current voltage.

The method as above can exert the same effect as the aforementioned interlocking adapter.

An interlocking adapter in further another aspect of the present disclosure comprises: a current path provided to supply a load current based on an alternating-current voltage received from an electric outlet provided in an electric apparatus; a capacitive load provided in the current path; a switch provided in the current path and is configured to be turned on and off, the current path being completed in response to the switch being turned on, the current path being interrupted in response to the switch being turned off; and a controller configured to turn on and off the switch in synchronization with a change of the alternating-current voltage in response to reception of an interlocking command signal from a working machine to supply the load current from the electric outlet to the capacitive load, the controller being configured to turn on and off the switch at a specified ratio of a time every ½ cycle of the alternating-current voltage.

In the interlocking adapter as above, consumption of electric power is reduced in the capacitive load. Since heat generation of the capacitive load is inhibited, the interlocking adapter can be downsized.

The capacitive load may include a capacitor. The capacitor may have an equivalent series resistance (ESR), desirably a low ESR.

BRIEF DESCRIPTION OF THE DRAWINGS

Example embodiments of the present disclosure will be described hereinafter with reference to the accompanying drawings, in which:

FIG. 5 is an explanatory view showing a variation of the control pattern of the switching part;

FIGS. 11A-11E are explanatory views showing an appearance of an interlocking adapter of the second embodiment, in which FIG. 11A is a plan view of the interlocking adapter, FIG. 11B is a side view of the interlocking adapter seen from below in FIG. 11A, FIG. 11C is a bottom view of the interlocking adapter, FIG. 11D is a left side view of the interlocking adapter, and FIG. 11E is a right side view of the interlocking adapter;

FIGS. 14A and 14B are perspective views showing the appearance of the interlocking adapter, in which FIG. 14A shows a state in which a hook is housed, and FIG. 14B shows a state in which the hook is pulled out.

DETAILED DESCRIPTION OF THE PREFERRED EMBODIMENTS

First Embodiment

Figure 1:
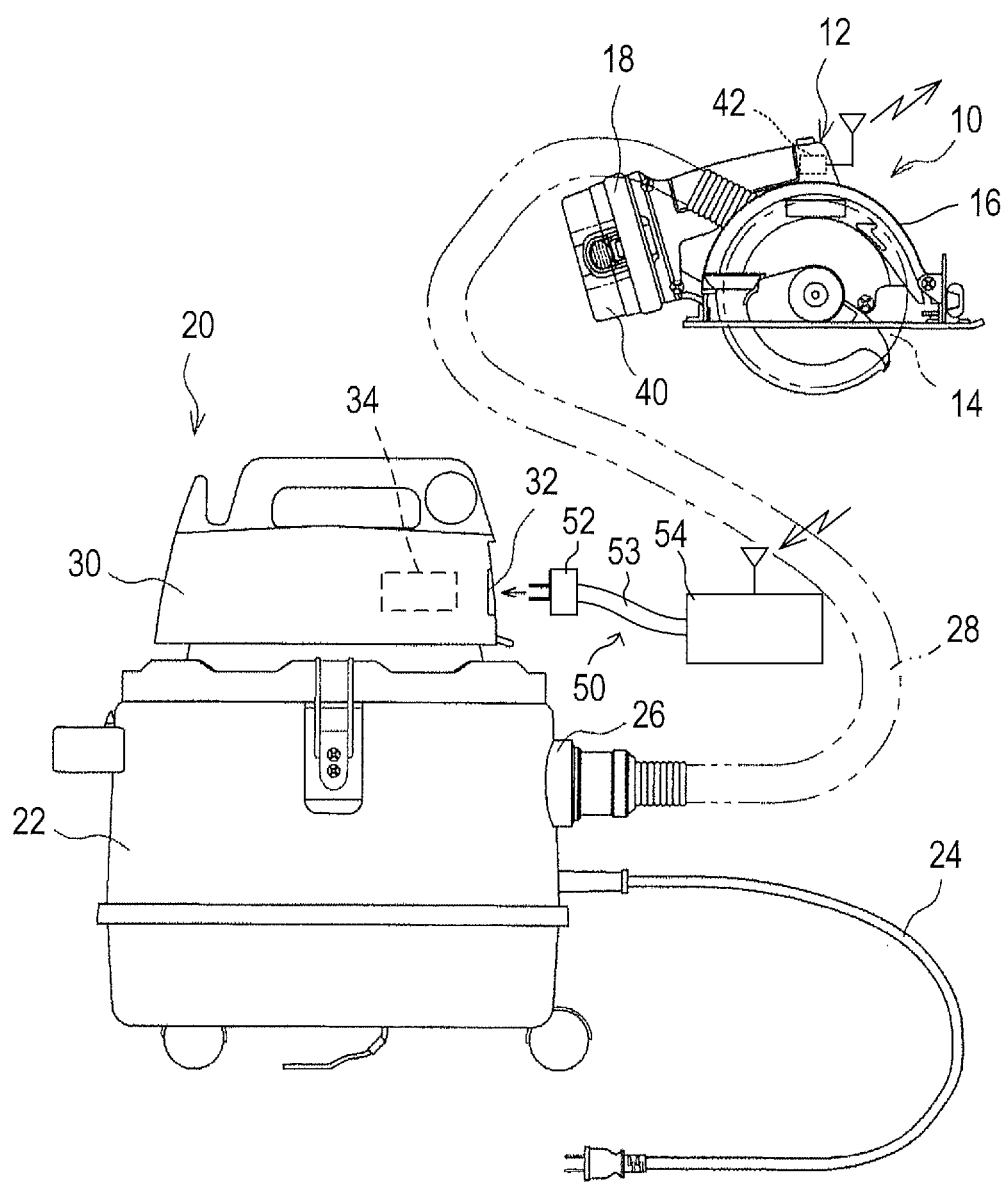
FIG. 1 is an explanatory view showing a configuration of an entire interlocking system of a first embodiment.

As shown in FIG. 1, an interlocking system of the present embodiment includes a circular saw 10 as one example of a working machine of the present disclosure. The interlocking system further includes a dust collector 20, which operates in conjunction with the circular saw 10, as one example of an electric apparatus of the present disclosure.

The dust collector 20 includes a tank 22. The dust collector 20 includes a dust collector main body 30 on top of the tank 22. The dust collector main body 30 includes an alternating current (AC) motor (not shown) and a suction fan (not shown) in the dust collector main body 30. The dust collector 20 includes a power cord 24 for receiving electric power from an AC power source (not shown) such as a commercial power source. The power cord 24 is drawn out from the tank 22.

The AC motor is driven by the electric power supplied from the AC power source coupled via the power cord 24 and rotates the suction fan. When the suction fan is rotated by the AC motor, a hose 28 coupled to a suction port 26 of the tank 22 sucks dust and the like around a leading end portion of the hose 28 together with the air. The sucked dust and air pass through the tank 22 into the dust collector main body 30. The air that has entered the dust collector main body 30 is discharged from the dust collector main body 30.

A filter (not shown) is provided between the tank 22 and the dust collector main body 30. The filter captures the dust and the like sucked via the hose 28. The captured dust and the like are collected in the tank 22.

The circular saw 10 includes a circular saw main body 12 including a motor (not shown). The circular saw 10 further includes a disc-shaped saw blade 14 attached to a rotation shaft protruding from the circular saw main body 12. The circular saw 10 further includes a blade case 16 attached to the circular saw main body 12 to cover the saw blade 14. The blade case 16 is coupled to the leading end portion of the hose 28 drawn out from the suction port 26 of the dust collector 20.

The dust collector 20, that operates in an interlocking manner with the circular saw 10 cutting a workpiece, can suck dust produced from the workpiece.

The dust collector main body 30 includes an electric outlet 32. The electric outlet 32 is provided to supply AC power to a working machine such as the circular saw 10. The dust collector main body 30 further includes a controller 34. The controller 34 detects electric current flowing from the electric outlet 32 to the working machine and drives the AC motor.

The dust collector 20 as such can operate in an interlocking manner, for example, with an AC-driven working machine having an AC plug plugged into the electric outlet 32.

The circular saw 10 of the present embodiment includes an attachment portion 18. The attachment portion 18 is configured to attach a battery pack 40 to the circular saw main body 12. The circular saw 10 is configured to drive a motor of the circular saw 10 by direct-current (DC) power supplied from the battery pack 40 attached to the attachment portion 18.

The circular saw 10 includes a transmitter 42. The transmitter 42 transmits an interlocking command signal in a wireless manner when the motor of the circular saw 10 is driven by operation of a user (in other words, when the workpiece is being cut). The interlocking command signal instructs an electric apparatus such as the dust collector 20 to operate in an interlocking manner with the circular saw 10. The transmitter 42 in another embodiment may also transmit an additional signal, in addition to the interlocking command signal, in a wireless manner.

The electric outlet 32 of the dust collector 20 is coupled to an interlocking adapter 50. The interlocking adapter 50 is configured to flow a specified load current into the interlocking adapter 50, in response to reception of the interlocking command signal transmitted from the transmitter 42.

The interlocking adapter 50 includes an AC plug 52. The AC plug 52 is plugged into the electric outlet 32 to be electrically coupled to the dust collector 20. The interlocking adapter 50 includes an adapter main body 54.

The adapter main body 54 receives the interlocking command signal transmitted from the transmitter 42. The adapter main body 54 draw the load current from the dust collector 20 via the AC plug 52, in response to reception of the interlocking command signal. The AC plug 52 is provided at a leading end of a power cord 53 drawn out from the adapter main body 54.

Figure 2:
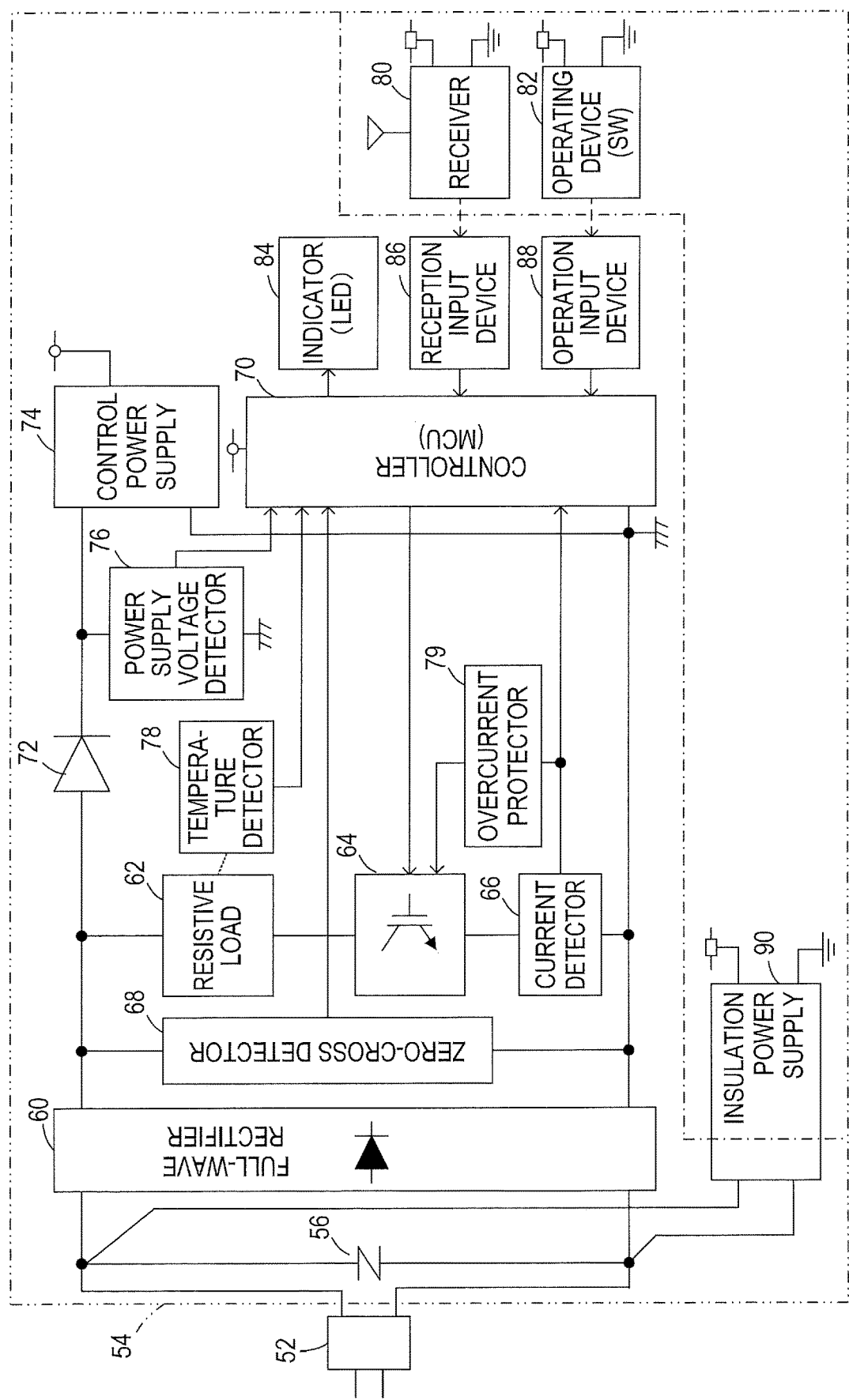
FIG. 2 is a block diagram showing a configuration of an interlocking adapter of the first embodiment.

As shown in FIG. 2, the adapter main body 54 includes a full-wave rectifier 60. The full-wave rectifier 60 rectifies full wave of an AC voltage supplied from the electric outlet 32 via the AC plug 52 and the power cord 53 so as to generate a rectified voltage. The full-wave rectifier 60 in the present embodiment may be provided with a bridge circuit (so-called diode bridge) configured to rectify the AC voltage with four diodes.

The rectified voltage generated by the full-wave rectifier 60 is applied to a series circuit formed with a resistive load 62, a switching part 64, and a current detector 66.

The resistive load 62 functions as an electric load through which a load current flows. The load current is used for the dust collector 20 to detect operation of the working machine. More specifically, the resistive load 62 of the present embodiment includes a resistor through which the load current flows.

The switching part 64 couples/interrupts the resistive load 62 and the current detector 66. The switching part 64 in the present embodiment includes an insulated gate bipolar transistor (IGBT). The switching part 64 in another embodiment may include another type of switching element such as a field effect transistor (FET), instead of or in addition to the IGBT.

The current detector 66 detects a value of the load current that flows through the current detector 66. The current detector 66 further outputs a detection signal indicating the value of the detected load current. The current detector 66 may include a resistor coupled in series to the resistive load 62 via the switching part 64, and output a voltage across the resistor as the detection signal.

The detection signal outputted from the current detector 66 is inputted to a controller 70 and an overcurrent protector 79.

The overcurrent protector 79 forcibly turns off the switching part 64 when the value of the load current detected by the current detector 66 exceeds a threshold value preset for determination of overcurrent, so as to inhibit or restrain flowing of overcurrent to the resistive load 62.

The resistive load 62 is provided with a temperature detector 78 including a thermistor. A detection signal (signal indicating temperature of the resistive load 62) outputted from the temperature detector 78 is inputted to the controller 70.

An output stage of the full-wave rectifier 60 (output stage of the rectified voltage) is coupled to a zero-cross detector 68, in addition to the aforementioned series circuit. The zero-cross detector 68 detects a zero-cross point of the AC voltage supplied from the electric outlet 32 of the dust collector 20 to the AC plug 52, and outputs a detection signal indicating detection of the zero-cross point. The detection signal outputted from the zero-cross detector 68 is inputted to the controller 70.

More specifically, the zero-cross detector 68 detects a timing at which the rectified voltage applied from the full-wave rectifier 60 to the zero-cross detector 68 becomes zero, as the zero-cross point.

The output stage of the full-wave rectifier 60 is coupled to a control power supply 74 via a diode 72. The diode 72 is provided to inhibit or restrain reverse flow of electric current from the control power supply 74 to the output stage of the full-wave rectifier 60. The control power supply 74 generates a power supply voltage (DC constant voltage) for operating an internal circuit of the adapter main body 54, such as the controller 70, based on the rectified voltage supplied from the full-wave rectifier 60.

A power supply voltage detector 76 is coupled to an input path of the rectified voltage to the control power supply 74. The power supply voltage detector 76 detects a voltage value of the rectified voltage (in other words, voltage value of the AC voltage), and outputs a detection voltage indicating the detected voltage value to the controller 70. The power supply voltage detector 76 may include at least two resistors, and output a rectified voltage divided by these two resistors to the controller 70 as the detection voltage.

The controller 70 includes a micro control unit (MCU) including at least a CPU, a ROM, and a RAM. Instead of or in addition to the MCU, the controller 70 may include, for example, a combination of electronic components such as a discrete device, an Application Specified Integrated Circuit (ASIC), an Application Specific Standard Product (ASSP), a programmable logic device such as, for example, Field Programmable Gate Array (FPGA), or a combination of the foregoing. The controller 70 executes a control process for supplying the load current to the resistive load 62 when the interlocking command signal is transmitted from the transmitter 42 of the circular saw 10.

The controller 70 utilizes the zero-cross point of the AC voltage detected by the zero-cross detector 68 and the voltage value of the AC voltage detected by the power supply voltage detector 76, in order to execute the control process.

The controller 70 further executes a protection process. In the protection process, the controller 70 determines an overheated state of the resistive load 62, based on the temperature of the resistive load 62 detected by the temperature detector 78 and the value of the load current detected by the current detector 66, and forcibly turns off the switching part 64.

The adapter main body 54 is provided with a receiver 80. The receiver 80 receives the interlocking command signal wirelessly transmitted from the transmitter 42 of the circular saw 10 in a wireless manner. The adapter main body 54 further includes an operating device 82. The operating device 82 is utilized by a user of the interlocking adapter 50 to manually perform mode setting of the interlocking adapter 50.

The operating device 82 includes a mode setting switch (not shown). The mode setting switch is operated so as to sequentially switch the mode setting of the interlocking adapter 50 to any one of a first mode, a second mode, and a third mode to be described later.

The controller 70 is coupled to a reception input device 86. The reception input device 86 receives a reception signal from the receiver 80. The controller 70 is coupled to an operation input device 88. The operation input device 88 receives an operation signal from the operating device 82.

The receiver 80 is a device separate from the adapter main body 54, or is included in a separate device. The receiver 80 is detachably attached to the adapter main body 54. Assuming that the adapter main body 54 is configured to supply electric power from the control power supply 74 to the receiver 80 when the receiver 80 is not attached to the adapter main body 54, the user may touch a terminal provided in the adapter main body 54 in order to supply the electric power to the receiver 80 and get an electric shock, or the control power supply 74 may fail.

In order to avoid such a risk, the interlocking adapter 50 includes an insulation power supply 90. The insulation power supply 90 receives the AC voltage through the input path of the AC voltage from the AC plug 52. The insulation power supply 90 converts (steps down) the received AC voltage with an isolation transformer, and then generates a power supply voltage for driving the receiver 80.

The receiver 80 receives the power supply voltage from the insulation power supply 90. Therefore, even if the user touches the terminal for supplying electric power to the receiver 80, direct application of the AC voltage from the AC plug 52 to the user can be avoided, and safety of the user can be ensured. The operating device 82 is a portion directly touched by the user for operation. Therefore, the operating device 82 receives the power supply voltage from the insulation power supply 90.

Assuming that the receiver 80 is directly coupled to the reception input device 86 via a signal line, or the operating device 82 is directly coupled to the operation input device 88 via a signal line, it may not be possible to ensure safety of the user.

Thus, in the present embodiment, the receiver 80 is coupled to the reception input device 86 via a first photo coupler (not shown) including a first light emitting device (not shown) and a first light receiving device (not shown). The operating device 82 is coupled to the operation input device 88 via a second photo coupler (not shown) including a second light emitting device (not shown) and a second light receiving device (not shown). Thus, the receiver 80 is electrically isolated from the reception input device 86, and the operating device 82 is electrically isolated from the operation input device 88, resulting in that safety of the user can be ensured.

A varistor 56 that functions as a surge absorber is provided in the aforementioned input path of the AC voltage. The varistor 56 protects the internal circuit from incoming noise.

The controller 70 is coupled to an indicator 84. The indicator 84 displays the mode setting (first mode, second mode or third mode) set via the operating device 82. The indicator 84 may include a LED, and display the mode setting by lighting the LED.

Figure 3:
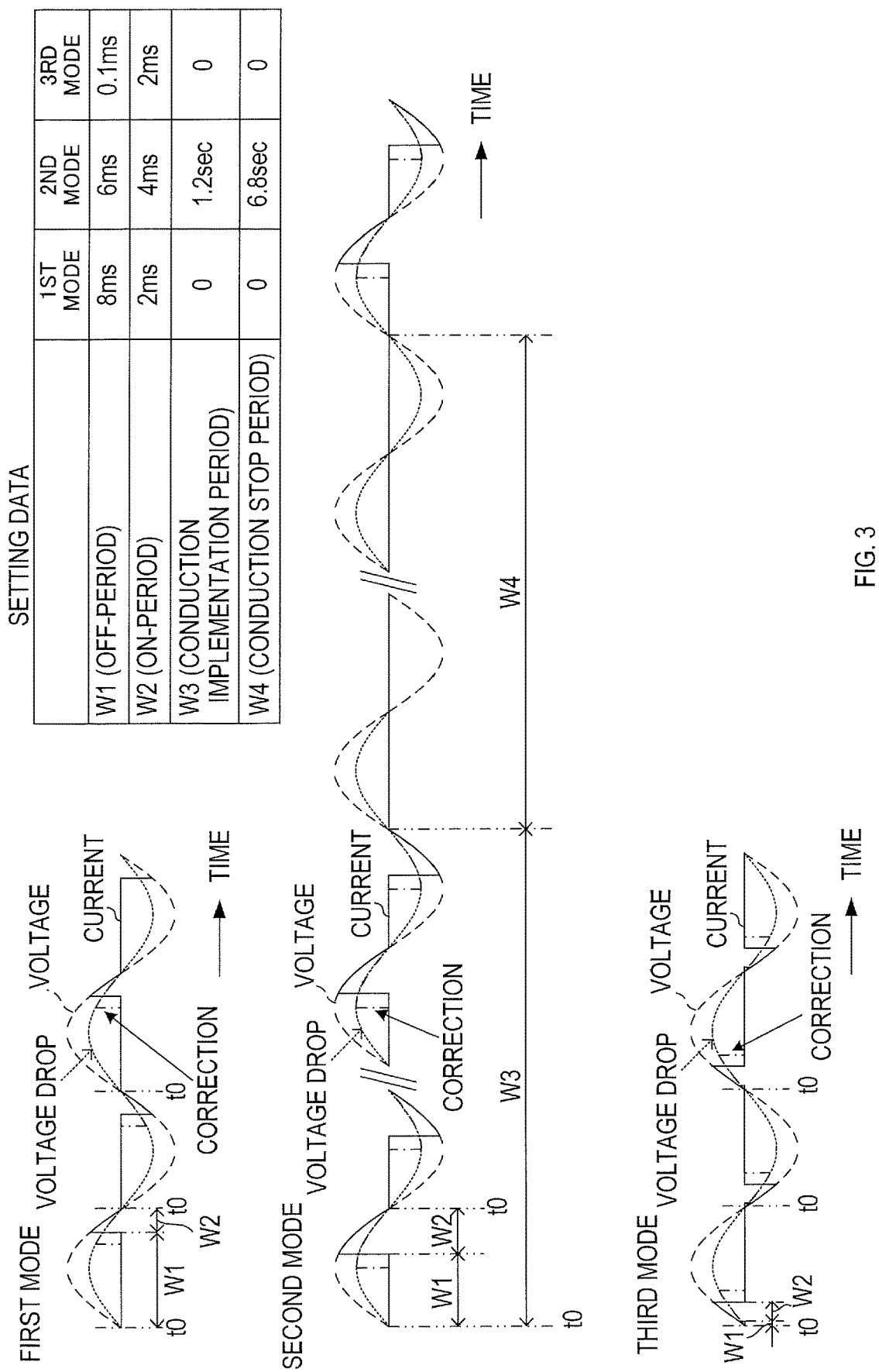
FIG. 3 is an explanatory view showing control patterns of a switching part set for each operation mode of the interlocking adapter.

As the mode setting that can be set via the operating device 82, the first mode, the second mode, and the third mode shown in FIG. 3 are provided in accordance with the type of the dust collector 20 that can implement interlocking operation using the interlocking adapter 50 of the present embodiment (more specifically, detection characteristic of the load current for determination of interlocking operation in the dust collector 20).

In the first mode, the controller 70 turns off the switching part 64 for a certain off-period W1 after detection of the zero-cross point for each detection cycle (that is, ½ cycle of the AC voltage) of the zero-cross point (time point t0 shown in FIG. 3) by the zero-cross detector 68. The controller 70 thereafter turns on the switching part 64 for a certain on-period W2 till the next zero-cross point.

The second mode is different from the first mode in ratio between a period during which the switching part 64 is turned on and a period during which the switching part 64 is turned off. The controller 70 in the second mode, as in the first mode, turns off the switching part 64 for a certain off-period W1 for each ½ cycle of the AC voltage, and thereafter turns on the switching part 64 for a certain on-period W2.

In the third mode, the controller 70, after detection of the zero-cross point for each ½ cycle of the AC voltage, waits for a short off-period (W1) and then turns on the switching part 64. The controller 70 then turns off the switching part 64 after a certain on-period W2 elapses.

The reason why the controller 70 in the third mode waits for a short time after detection of the zero-cross point and turns on the switching part 64 is because electric current flowing through the motor of the AC-driven electric power tool which is originally coupled to the electric outlet 32 is delayed by about 0.1 ms with respect to a voltage phase. In other words, the controller 70 in the third mode waits for a short time after detection of the zero-cross point and then turns on the switching part 64, in order not to supply electric current for the delay time.

The memory (for example, ROM) of the controller 70 stores the off-period W1 and the on-period W2 as setting data for each of the first mode, the second mode, and the third mode. The off-period W1 corresponds to the period during which the switching part 64 is turned off after the zero-cross point of the AC voltage is detected, as described above. The on-period W2 corresponds to the period during which the switching part 64 is turned on after the off-period W1 elapses, as described above.

The off-period W1 and the on-period W2 shown in FIG. 3 respectively represent the off-period immediately after detection of the zero-cross point and the subsequent on-period, when the AC voltage has a frequency of 50 Hz and the ½ cycle is 10 ms.

In the second mode, the controller 70 not only switches the on-state and the off-state of the switching part 64 every ½ cycle of the AC voltage, but also executes a conduction implementation control for supplying the load current in a certain conduction implementation period W3. In the conduction implementation control, the controller 70 switches the on-state and the off-state of the switching part 64 to supply the load current to the resistive load 62.

After the conduction implementation period W3 elapses, the controller 70 executes a conduction stop control in a certain conduction stop period W4 thereafter. In the conduction stop control, the controller 70 holds the switching part 64 in the off-state and stops supply of the load current. After execution of the conduction stop control, the controller 70 alternately executes the conduction implementation control and the conduction stop control each time the conduction implementation period W3 or the conduction stop period W4 elapses.

Therefore, in the setting data of the second mode, as shown in FIG. 3, in order to alternately execute the conduction implementation control and the conduction stop control, time indicating the conduction implementation period W3 and time indicating the conduction stop period W4 are set. In the setting data of the first mode and the setting data of the third mode, the conduction implementation period W3 and the conduction stop period W4 are set to 0.

Each of the conduction implementation period W3 and the conduction stop period W4 is set longer than 1 cycle of the AC voltage. The conduction implementation period W3 may be set to any time during which the dust collector 20 can determine implementation of interlocking operation. For example, the conduction implementation period W3 may be set to 1 cycle of the AC voltage.

Also, the conduction stop period W4 may be set shorter than operation continuation time from when the dust collector 20 stops detection of the specified load current until driving of the AC motor is stopped.

The longer the conduction stop period W4 is, the smaller an amount of current (effective current) supplied to the resistive load 62 for interlocking operation is, resulting in reduction in power consumption of the interlocking adapter 50. The conduction stop period W4 corresponding to 1 cycle of the AC voltage can reduce power consumption, as compared to continuous execution of the conduction implementation control. Therefore, the conduction stop period W4, similar to the conduction implementation period W3, may be set to 1 cycle of the AC voltage.

The control process executed by the controller 70 to operate the dust collector 20 in an interlocking manner with the circular saw 10 will be described.

Figure 4A:
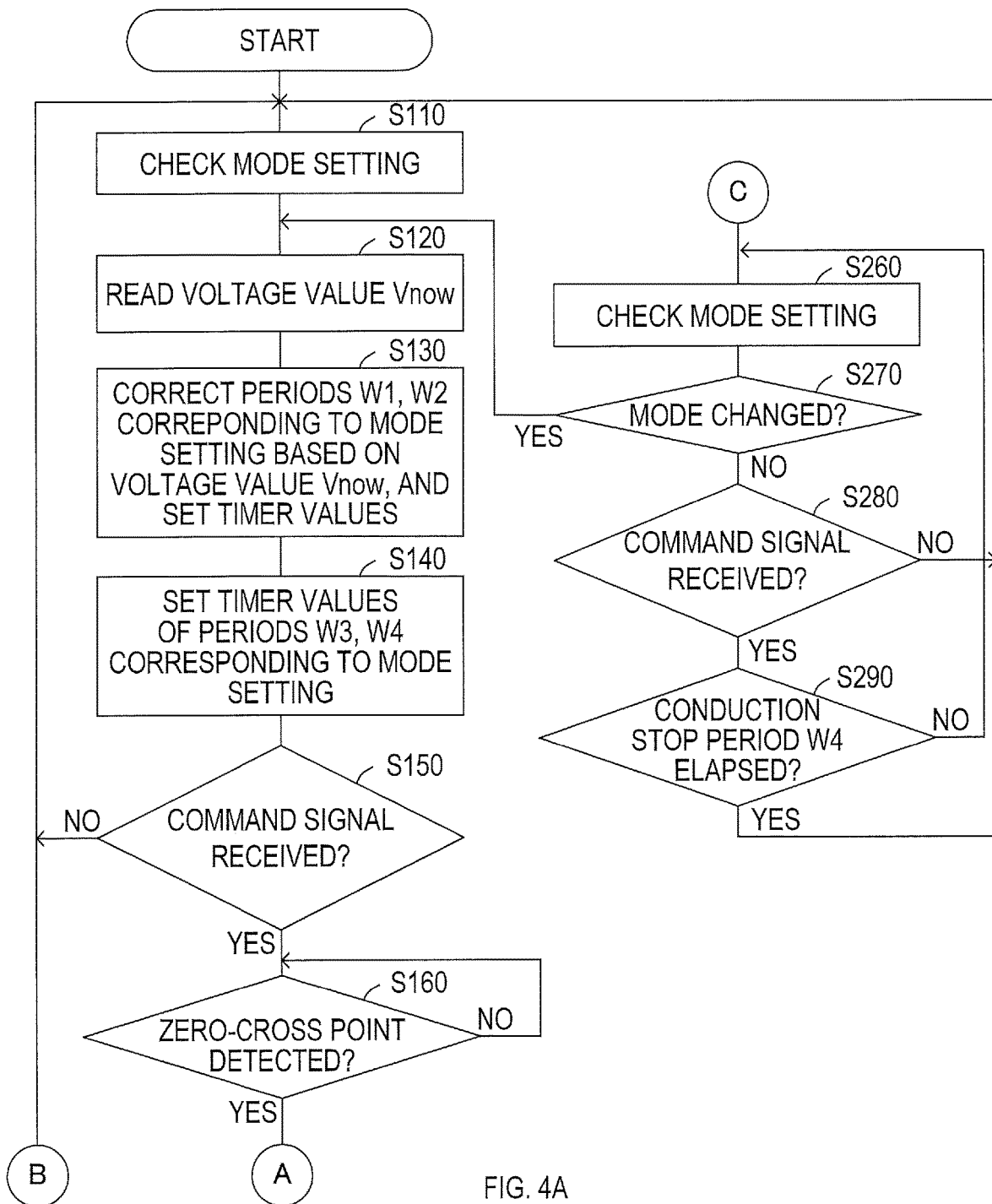
FIG. 4A is a flowchart showing a part of a control process executed to turn on and off the switching part by a controller.
Figure 4B:
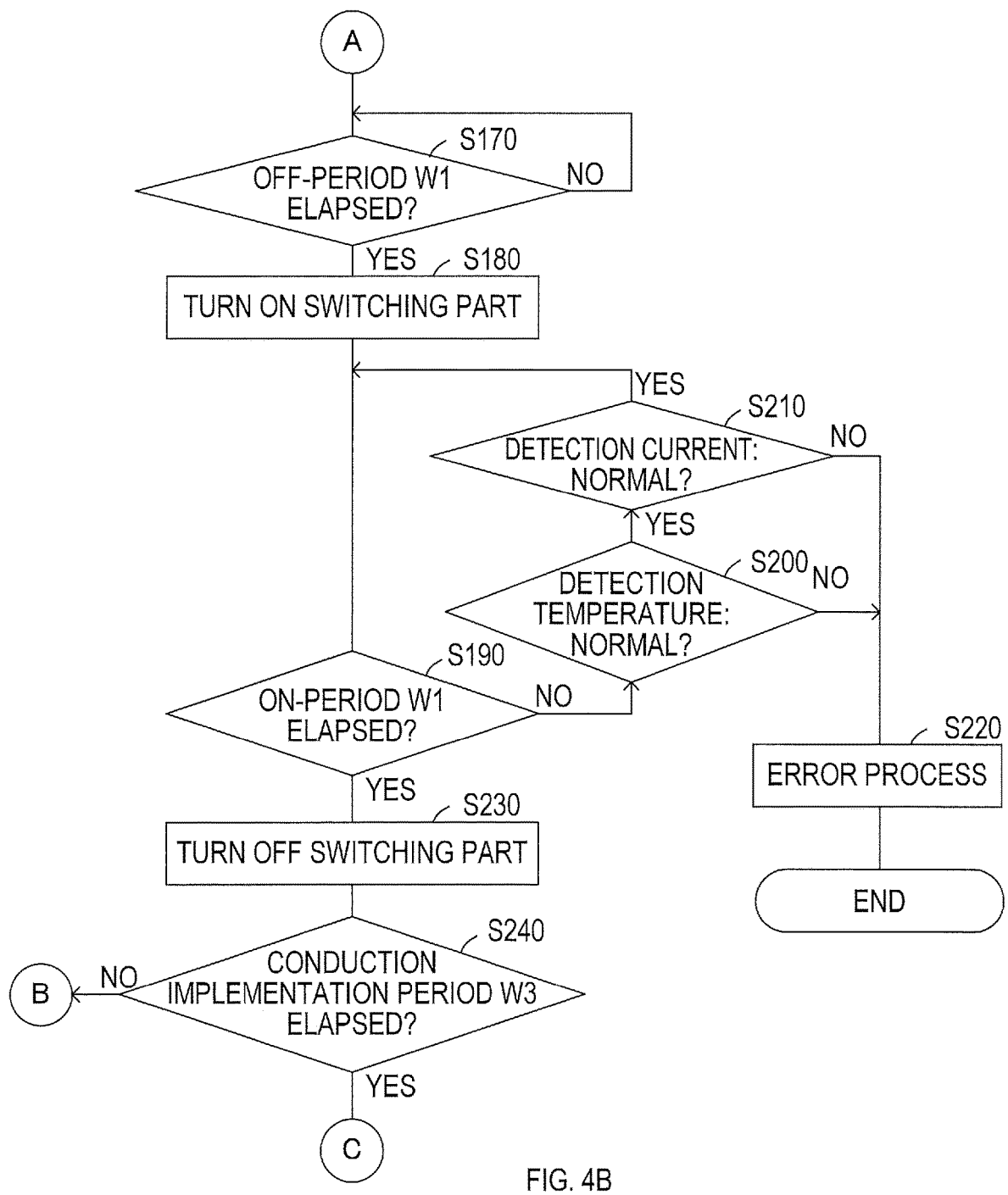
FIG. 4B is a flowchart showing the rest of the control process.
Figure 6A:
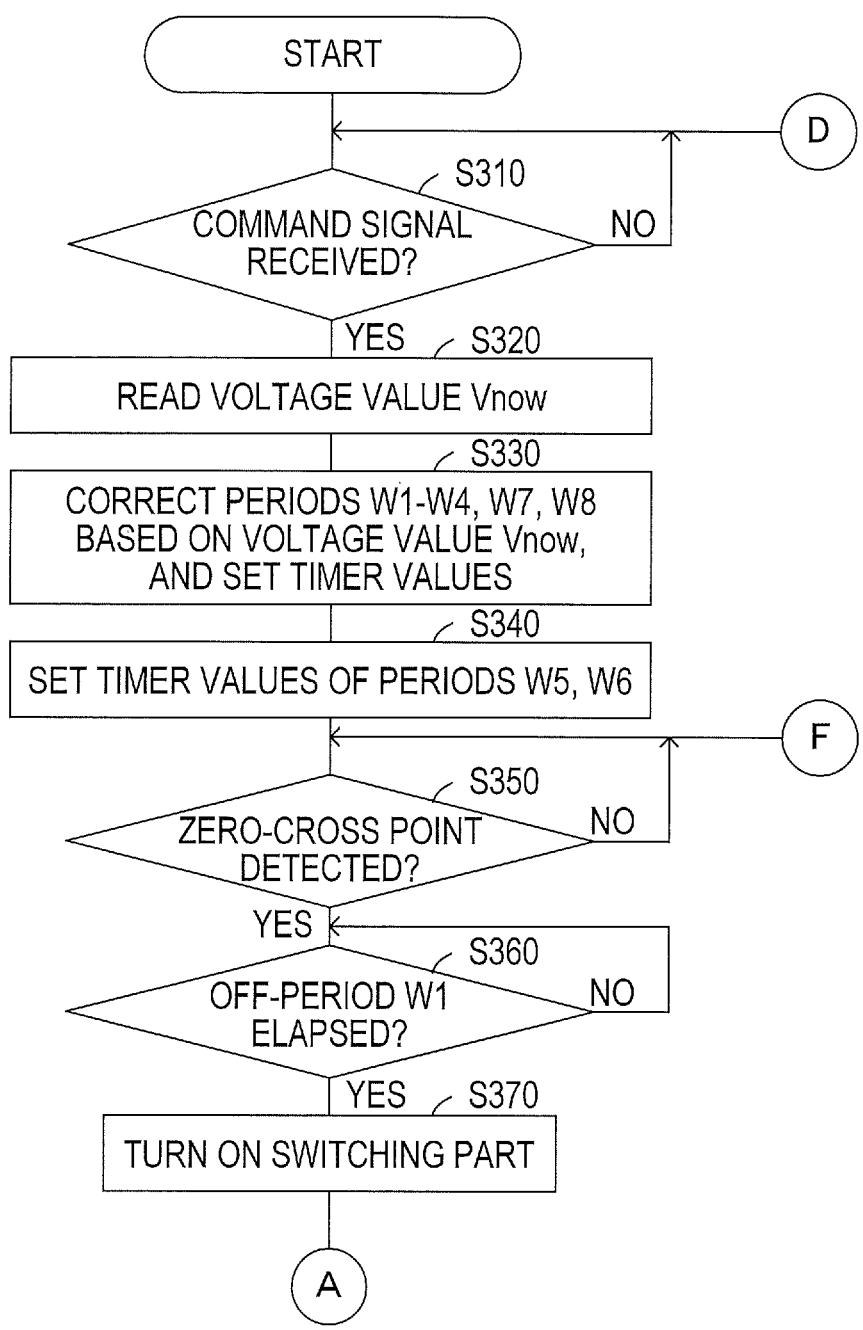
FIG. 6A is a flowchart showing a first part of a control process executed in accordance with the control pattern of FIG. 5.
Figure 6B:
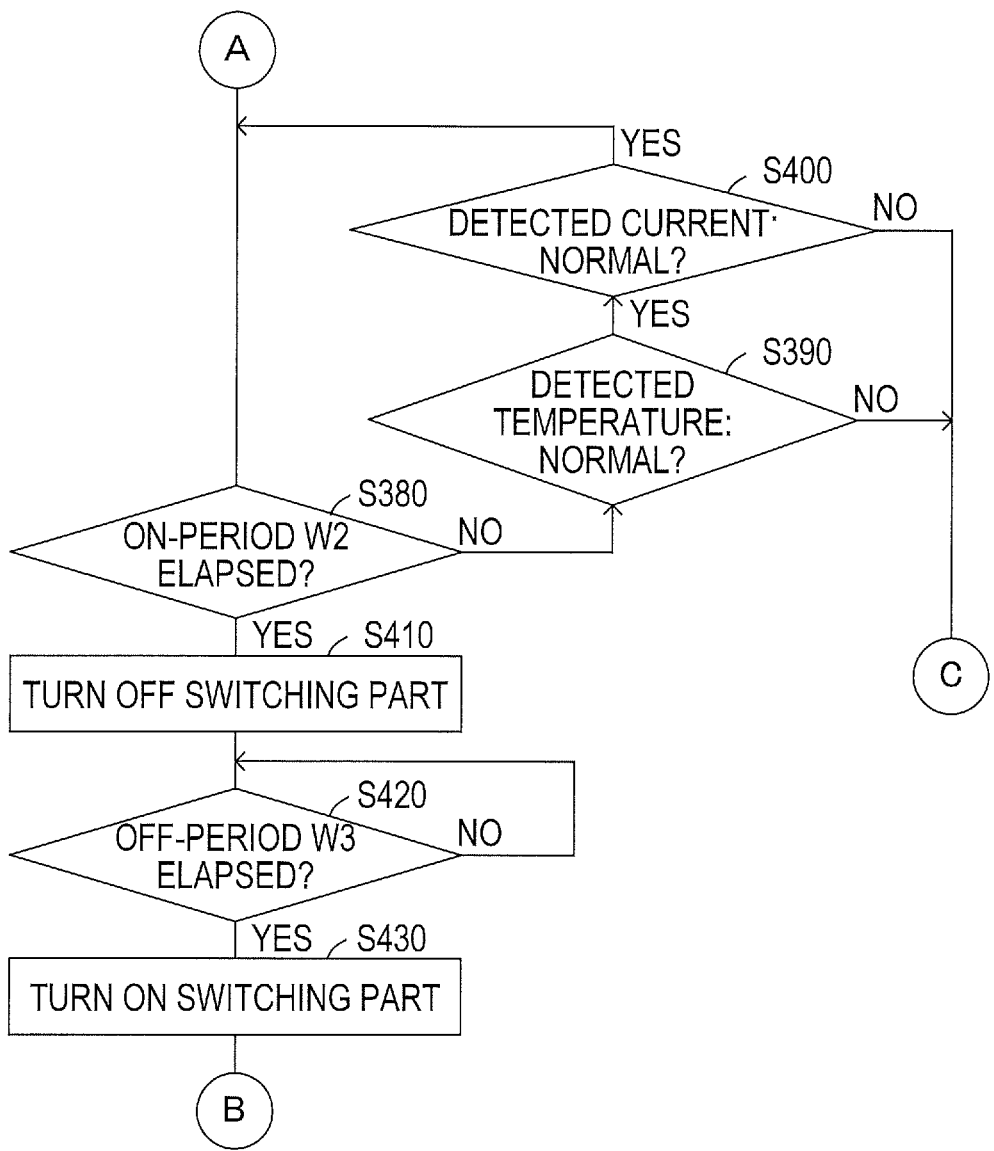
FIG. 6B is a flowchart showing a second part of the control process.
Figure 6C:
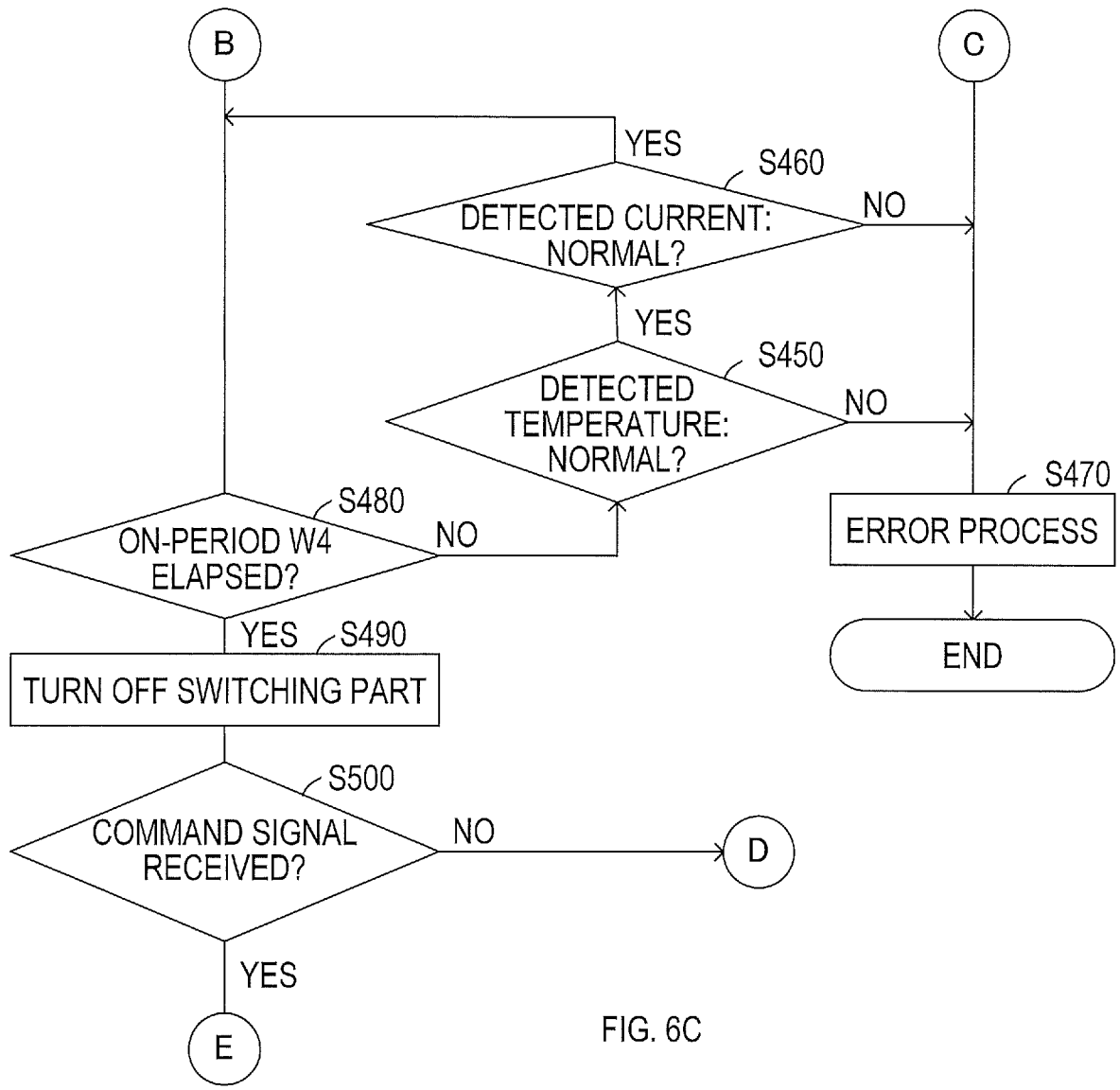
FIG. 6C is a flowchart showing a third part of the control process.
Figure 6D:
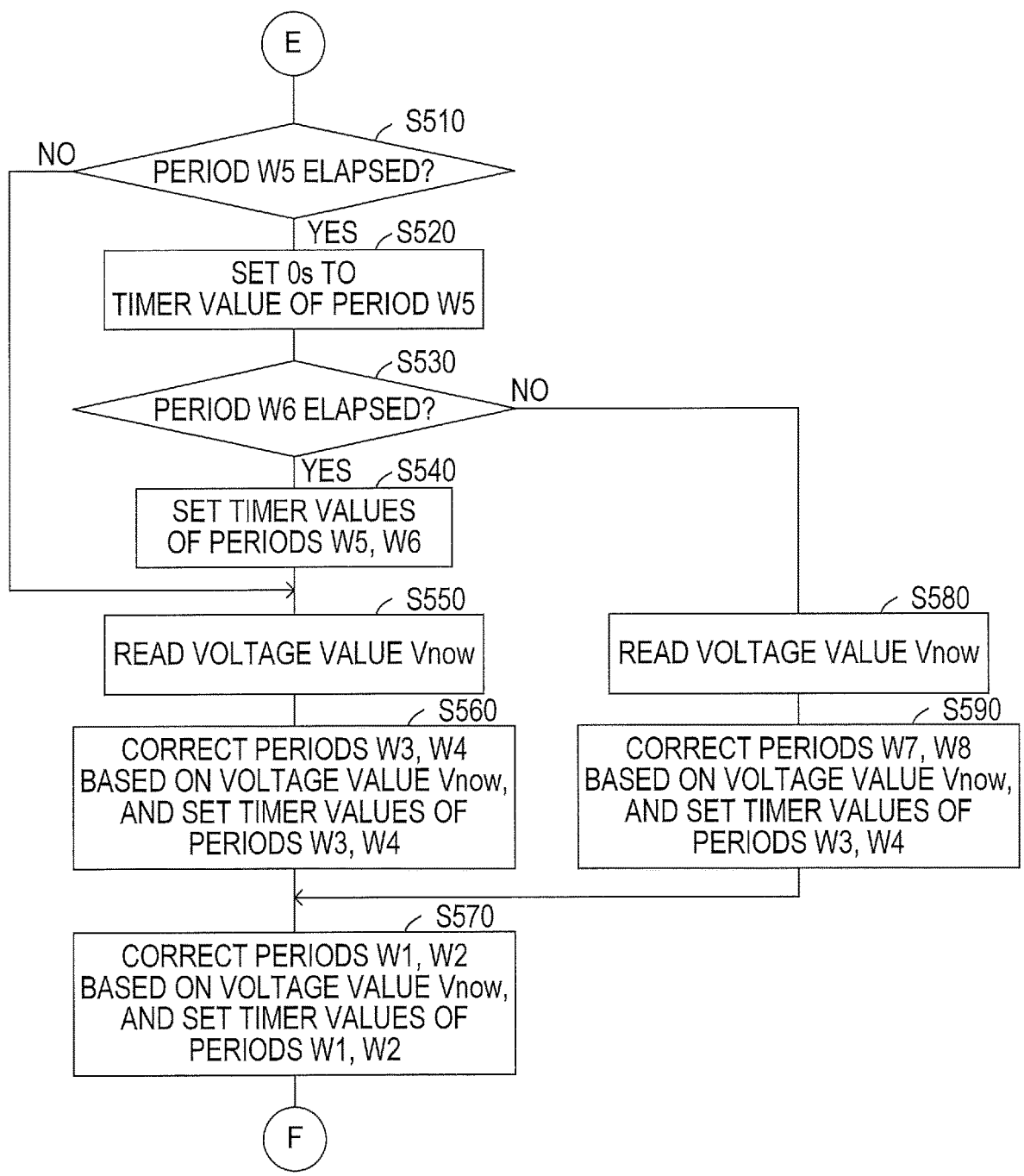
FIG. 6D is a flowchart showing the rest of the control process.

As shown in FIGS. 4A and 4B, when the control process is started, the controller 70 checks the current mode setting (that is, whether it is the first mode, the second mode, or the third mode) in S110. The controller 70 reads a current voltage value Vnow of the AC voltage from the power supply voltage detector 76 in S120.

In S130, the controller 70 reads the off-period W1 and the on-period W2 from the setting data corresponding to the current mode setting, corrects each of the off-period W1 and the on-period W2 using the voltage value Vnow, and sets the corrected off-period W1 and the corrected on-period W2 as a timer value for measurement by a timer.

As shown in FIG. 3, when the AC voltage supplied from the electric outlet 32 of the dust collector 20 decreases, the amount of the load current supplied to the resistive load 62 during the on-period W2 of the switching part 64 decreases. There is a possibility that the dust collector 20 can no longer determine implementation of interlocking operation.

Therefore, each of the off-period W1 and the on-period W2 is corrected so that the amount of electric current flowing through the resistive load 62 during the on-period W2 of the switching part 64 is an amount required for the dust collector 20 to determine implementation of interlocking operation, and set as the timer value.

In S130, the controller 70 corrects the off-period W1 and the on-period W2 based on a ratio between a reference voltage value Vref corresponding to the setting data and the voltage value Vnow. More specifically, the controller 70 corrects the off-period W1 and the on-period W2 so that the on-period W2 is longer when the voltage value Vnow is lower than the reference voltage value Vref. When the voltage value Vnow is higher than the reference voltage value Vref, the controller 70 corrects the off-period W1 and the on-period W2 so that the on-period W2 is shorter.

Next in S140, the controller 70 reads the conduction implementation period W3 and the conduction stop period W4 from the setting data corresponding to the mode setting, and sets each of the periods W3, W4 as the timer value.

In this way, when the timer value of each of the periods W1 to S4 is set, the controller 70 proceeds to S150, and determines whether the interlocking command signal transmitted from the transmitter 42 of the circular saw 10 is received by the receiver 80. If the interlocking command signal is not received (S150: NO), then the controller 70 proceeds to S110. If the interlocking command signal is received (S150: YES), then the controller 70 proceeds to S160.

In S160, the controller 70 determines whether the zero-cross point of the AC voltage is detected by the zero-cross detector 68, and waits for the detection of the zero-cross point (S160: NO). When the zero-cross point is detected (S160: YES), the controller 70 proceeds to S170, and determines whether the off-period W1 set as the timer value has elapsed, and waits for the elapse of the off-period W1 (S170: NO).

When it is determined in S170 that the off-period W1 has elapsed (S170: YES), the controller 70 proceeds to S180, switches the switching part 64 from the off-state to the on-state, starts supply of the load current to the resistive load 62, and proceeds to S190.

In S190, the controller 70, after switching the switching part 64 to the on-state in S180, determines whether the on-period W2 set as the timer value has elapsed. In S190, if it is determined that the on-period W2 has not elapsed (S190: NO), then the controller 70 proceeds to S200, and determines whether the temperature of the resistive load 62 detected by the temperature detector 78 is normal (or proper), more specifically, whether it is lower than a maximum temperature set in advance.

In S200, if it is determined that the temperature of the resistive load 62 is lower than the maximum temperature and is normal (S200: YES), then the controller 70 proceeds to S210, and determines whether a value of the load current detected by the current detector 66 is lower than a maximum value and is normal (or proper). In S210, if it is determined that the value of the load current is lower than the maximum value and is normal (S210: YES), then the controller 70 proceeds to S190 again, and determines whether the on-period W2 has elapsed.

In S200, if it is determined that the temperature of the resistive load 62 is abnormal (or improper) (S200: NO) or in S210 that the value of the load current is abnormal (or improper) (S210: NO), then the controller 70 proceeds to S220, executes an error process, and terminates the control process. In the error process, the controller 70 switches the switching part 64 to the off-state, and displays the abnormal state on the indicator 84.

If it is determined in S190 that the on-period W2 has elapsed (S190: YES), then the controller 70 proceeds to S230, switches the switching part 64 to the off-state, and stops supply of the load current. In subsequent S240, the controller 70 determines whether the conduction implementation period W3 set as the timer value in S140 has elapsed. If it is determined in S240 that the conduction implementation period W3 has not elapsed (S240: NO), then the controller 70 proceeds to S110. If it is determined in S240 that the conduction implementation period W3 has elapsed (S240: YES), then the controller 70 proceeds to S260.

In S260, the controller 70 checks the current mode setting as in S110, and proceeds to S270. In S270, the controller 70 determines whether the mode setting is changed. If it is determined that the mode setting is changed (S270: YES), then the controller 70 proceeds to S120.

In S270, if it is determined that the mode setting is not changed (S270: NO), then the controller 70 proceeds to S280, and determines whether the interlocking command signal is received by the receiver 80 as in S150.

If it is determined in S280 that the interlocking command signal is not received (S280: NO), then the controller 70 proceeds to S110. If it is determined in S280 that the interlocking command signal is received (S280: YES), then the controller 70 proceeds to S290, where it is determined whether the conduction stop period W4 set as the timer value in S140 has elapsed after it is determined in S240 that the conduction implementation period W3 has elapsed.

When it is determined in S290 that the conduction stop period W4 has elapsed (S290: YES), the controller 70 proceeds to S110. When it is determined in S290 that the conduction stop period W4 has not elapsed (S290: NO), the controller 70 proceeds to S260.

As above, the controller 70 executes the control process by way of procedures shown in FIGS. 4A and 4B, and thereby the on-state and the off-state of the switching part 64 is switched in synchronization with the change of the AC voltage, in accordance with the mode setting set by operation of the user of the operating device 82.

The control pattern of the switching part 64 in each of the first mode, the second mode, and the third mode is set in advance as shown in FIG. 3. The switching part 64 is turned on and off at a specified ratio of a time every ½ cycle of the AC voltage.

Therefore, according to the interlocking adapter 50 of the present embodiment, as compared to the aforementioned interlocking adapter disclosed in Japanese Patent No. 4955332, it is possible to reduce the amount of the load current (in other words, effective current value) supplied to the resistive load 62 in order to operate the dust collector 20 in an interlocking manner with the circular saw 10, and reduce power consumption. Since the load current supplied to the resistive load 62 can be reduced, it is possible to reduce an amount of heat generation of the resistive load 62, and downsize the interlocking adapter 50.

In the mode setting of the interlocking adapter 50, the first mode, the second mode, and the third mode are set in accordance with the detection characteristic of the load current of the dust collector 20 operated in an interlocking manner with the circular saw 10 using the interlocking adapter 50. The user can select the mode setting by operating the operating device 82.

Therefore, by selecting the mode setting of the interlocking adapter 50 in accordance with the type of the dust collector 20, the user can set a supply period of the load current, that is supplied to the resistive load 62 to operate the dust collector 20 in an interlocking manner, to a minimum, and reduce power consumption of the interlocking adapter 50.

In the second mode, the control pattern of the switching part 64 is set so that the conduction implementation control and the conduction stop control are alternately executed in accordance with an operation characteristic of the dust collector 20 during the interlocking operation. Therefore, in the second mode, as compared to the first mode and the third mode, electric current supplied to the resistive load 62 for interlocking operation can be further reduced.

The interlocking adapter 50 of the present first embodiment, by operation of the operating device 82 to switch the mode setting, can operate several types of dust collectors 20 in an interlocking manner. Therefore, usability of the circular saw 10 and/or the dust collector 20 can be improved

[Variations]

One embodiment of the present disclosure has been described in the above, but the interlocking adapter 50 of the present disclosure is not limited to the aforementioned first embodiment, and can be practiced in various modes.

In the aforementioned first embodiment, three modes in accordance with the type of the dust collector 20, that is, three modes corresponding to the detection characteristic of the load current in the dust collector 20 are set, and the user selects one of the modes.

The control pattern of the switching part 64 shown in FIG. 5 is one example of a single control pattern from which any of a plurality of types of dust collectors specified in advance can detect the load current and determine implementation of interlocking operation.

The interlocking adapter 50 may switch the switching part 64 to the on-state or the off-state according to the single control pattern shown in FIG. 5 when receiving the interlocking command signal from the circular saw 10. As a result, the user no longer requires change of the mode setting. Usability of the interlocking adapter 50 can be enhanced.

The control pattern shown in FIG. 5 is set so as to have a first on-period and a second on-period every ½ cycle of the AC voltage. The switching part 64 is turned on in each of the first on-period and the second on-period.

A length of the second on-period (second half conduction on-period) is set such that the magnitude of the load current is alternately switched to be large or small for each specified period W5, W6 which is longer than 1 cycle of the AC voltage.

In the period W5, for every ½ cycle of the AC voltage, the switching part 64 is turned on for the same on-period W2 as the on-period W2 of the third mode of the aforementioned first embodiment in a first half of the ½ cycle. In the second half of the ½ cycle, the switching part 64 is turned on for the same on-period W4 as the on-period W2 of the second mode of the aforementioned first embodiment.

In the W6, for every ½ cycle of the AC voltage, the switching part 64 is turned on for the same on-period W2 as the on-period W2 of the third mode of the aforementioned first embodiment in the first half of the ½ cycle. In the second half of the ½ cycle, the switching part 64 is turned on for the same on-period W8 as the on-period W2 of the first mode of the aforementioned first embodiment.

Therefore, by turning on and off the switching part 64 in the control pattern of the present variation, the load current supplied by switching the mode setting in the aforementioned first embodiment can be supplied in one control pattern.

Setting data of the control pattern in the period W5 include the off-period W1, the on-period W2, the off-period W3, and the on-period W4. The off-period W1 is set to a period during which the switching part 64 is turned off after detection of the zero-cross point. The off-period W2 is set to a period during which the switching part 64 is turned on after elapse of the off-period W1. The off-period W3 is set to a period during which the switching part 64 is turned off after elapse of the on-period W2. The on-period W4 is set to a period during which the switching part 64 is turned on after elapse of the off-period W3 until the next zero-cross point.

Setting data of the control patter in the period W6 includes the off-period W1, the on-period W2, the off-period W7, and the on-period W8. The off-period W1 and the on-period W2 are the same as the off-period W1 and the on-period W2 in the period W5, respectively. The off-period W7 is set to a period during which the switching part 64 is turned off after elapse of the on-period W2. The off-period W7 is set to be longer than the off-period W3 in the period W5. The on-period W8 is set to a period during which the switching part 64 is turned on after elapse of the off-period W7 until the next zero-cross point. The on-period W8 is set to be shorter than the on-period W4 in the period W5.

As a result, in the period W6, as compared to the period W5, the magnitude of the load current supplied within ½ cycle of the AC voltage is reduced.

A control process will be described which is executed by the controller 70 in order to turn on and off the switching part 64 in the control pattern shown in FIG. 5 and supply the load current to the resistive load 62.

As shown in FIGS. 6A-6D, in this control process, the controller 70 first determines in S310 whether the interlocking command signal transmitted from the transmitter 42 of the circular saw 10 is received by the receiver 80, and waits for reception of the interlocking command signal (S310: NO).

If the interlocking command signal is received (S310: YES), then the controller 70 proceeds to S320, and reads the voltage value Vnow of the current AC voltage from the power supply voltage detector 76.

In subsequent S330, the controller 70, using the voltage value Vnow read in S320, corrects the periods W1 to W4, W7, W8 defined by the control pattern.

This correction is a process for inhibiting or restricting fluctuation of the magnitude of the load current supplied to the resistive load 62 caused by fluctuation of the AC voltage. By this process, each of the periods W1 to W4, W7, W8 is corrected based on a ratio between the reference voltage value Vref corresponding to the setting data of the control pattern and the voltage value Vnow, as in the aforementioned S130.

In S330, the controller 70 sets the corrected periods W1 to W4, W7, W8 to the respective timers as the timer value.

In subsequent S340, the controller 70 reads the periods W5 and W6 from the setting data of the control pattern, and sets the read periods W5 and W6 to the respective timers as the timer value.

After setting the timer values of the periods W1 to W8, the controller 70 proceeds to S350, determines whether the zero-cross point of the AC voltage has been detected by the zero-cross detector 68, and waits for detection of the zero-cross point (S350: NO).

When the zero-cross point is detected (S350: YES), the controller 70 proceeds to S360, determines whether the off-period W1 has elapsed based on the timer value set to the timer after detection of the zero-cross point, and waits for elapse of the off-period W1 (S360: NO).

In S360, if it is determined that the off-period W1 has elapsed (S360: YES), the controller 70 proceeds to S370, switches the switching part 64 from the off-state to the on-state, starts supply of the load current to the resistive load 62, and proceeds to S380.

In S380, the controller 70 determines whether the on-period W2 has elapsed based on the timer value set to the timer after switching the switching part 64 to the on-state in S370. If it is determined in S380 that the on-period W2 has not elapsed (S380: NO), then the controller 70 proceeds to S390, and determines whether the temperature of the resistive load 62 detected by the temperature detector 78 is normal.

In S390, when it is determined that the temperature of the resistive load 62 is lower than the maximum temperature and is normal (S390: YES), the controller 70 proceeds to S400, and determines whether the value of the load current detected by the current detector 66 is normal. In S400, if it is determined that the value of the load current is lower than the maximum value and is normal (S400: YES), then the controller 70 again proceeds to S380, and determines whether the on-period W2 has elapsed.

If it is determined in S390 that the temperature of the resistive load 62 is abnormal (S390: NO) or in S400 that the value of the load current is abnormal (S400: NO), then the controller 70 proceeds to S470, executes the error process, and terminates the control process. In the error process, the controller 70 switches the switching part 64 to the off-state, and displays the abnormal state on the indicator 84.

If it is determined in S380 that the on-period W2 has elapsed (S380: YES), then the controller 70 proceeds to S410, switches the switching part 64 to the off-state, and stops supply of the load current. In subsequent S420, the controller 70 determines whether the off-period W3 has elapsed based on the timer value set to the corresponding timer after turning off the switching part 64 in S410, and waits for elapse of the off-period W3 (S420: NO).

If it is determined in S420 that the off-period W3 has elapsed (S420: YES), then the controller 70 proceeds to S430, and switches the switching part 64 to the on-state. In subsequent S480, the controller 70 determines whether the on-period W4 has elapsed after switching the switching part 64 to the on-state based on the timer value set to the corresponding timer.

If it is determined in S480 that the on-period W4 has not elapsed, then the controller 70 proceeds to S450, and determines whether the temperature of the resistive load 62 detected by the temperature detector 78 is normal.

If it is determined in S450 that the temperature of the resistive load 62 is lower than the maximum temperature and is normal (S450: YES), then the controller 70 proceeds to S460, and determines whether the value of the load current detected by the current detector 66 is normal.

When it is determined in S460 that the value the load current is lower than the maximum value and is normal (S460: YES), the controller 70 again proceeds to S480, and determines whether the on-period W4 has elapsed.

If it is determined in S450 that the temperature of the resistive load 62 is abnormal (S450: NO) or in S460 that the value of the load current is abnormal (S460: NO), then the controller 70 proceeds to S470, executes the error process, and terminates the control process.

When it is determined in S480 that the on-period W4 has elapsed, the controller 70 proceeds to S490, and switches the switching part 64 to the off-state. In subsequent S500, the controller 70 determines whether the interlocking command signal is received by the receiver 80.

If it is determined in S500 that the interlocking command signal is not received (S500: NO), then the controller 70 proceeds to S310. If it is determined in S500 that the interlocking command signal is received (S500: YES), then the controller 70 proceeds to S510, and determines whether the period W5 has elapsed based on the timer value set to the corresponding timer. When it is determined in S510 that the period W5 has not elapsed (S510: NO), the controller 70 proceeds to S550 to be explained later. When it is determined in S510 that the period W5 has elapsed (S510: YES), the controller 70 proceeds to S520, and set 0 seconds to the corresponding timer as the timer value of the period W5.

In subsequent S530, the controller 70 determines whether the period W6 set as the timer value has elapsed after it is determined that the period W5 has elapsed. When it is determined in S530 that the period W6 has not elapsed (S530: NO), the controller 70 in S580 reads the voltage value Vnow of the current AC voltage from the power supply voltage detector 76, and in subsequent S590, using the read voltage value Vnow, corrects the periods W7, W8 defined in the control pattern.

In S590, the controller 70 set the corrected periods W7, W8 as the timer values of the periods W3, W4, and proceeds to S570.

The reason why the controller 70 in S590 sets the corrected periods W7, W8 as the timer values of the periods W3, W4 is to change the control pattern of the switching part 64 to a control pattern for supplying a small current, and drive the switching part 64 in the changed control pattern in the aforementioned process of S350 to S490.

When it is determined in S530 that the period W6 has elapsed (S530: YES), the controller 70 proceeds to S540, sets the timer values of the periods W5, W6, and proceeds to S550.

The controller 70 reads the voltage value Vnow from power supply voltage detector 76 in S550, and, using the read voltage value Vnow, corrects the periods W3, W4 defined in the control pattern in subsequent S560.

In S560, the controller 70 further sets the corrected periods W3, W4 as the timer values of the periods W3, W4, and proceeds to S570. In S570, the controller 70 corrects the periods W1, W2 based on the voltage value Vnow read in S580 or S550, and sets the timer values of the corrected periods W1, W2 to the corresponding timers. When the process of S570 is executed, the controller 70 proceeds to S350, and executes the processes after S350.

As above, when the controller 70 executes the control process shown in FIGS. 6A to 6D, it is possible to control the switching part 64 in the control pattern shown in FIG. 5 and supply to the resistive load 62 the load current that can cause different types of dust collectors to operate in an interlocking manner with the circular saw 10.

Second Embodiment

A second embodiment of the present disclosure will be described below.

The interlocking adapter 50 of the second embodiment has a configuration substantially similar to the interlocking adapter 50 of the first embodiment. The second embodiment is different from the first embodiment in that a fan for cooling the resistive load 62 is provided in the adapter main body 54.

In the second embodiment, a difference from the first embodiment, such as a driving method of the fan will be described, and the same configuration as that of the first embodiment will not be repeated.

Figure 7:
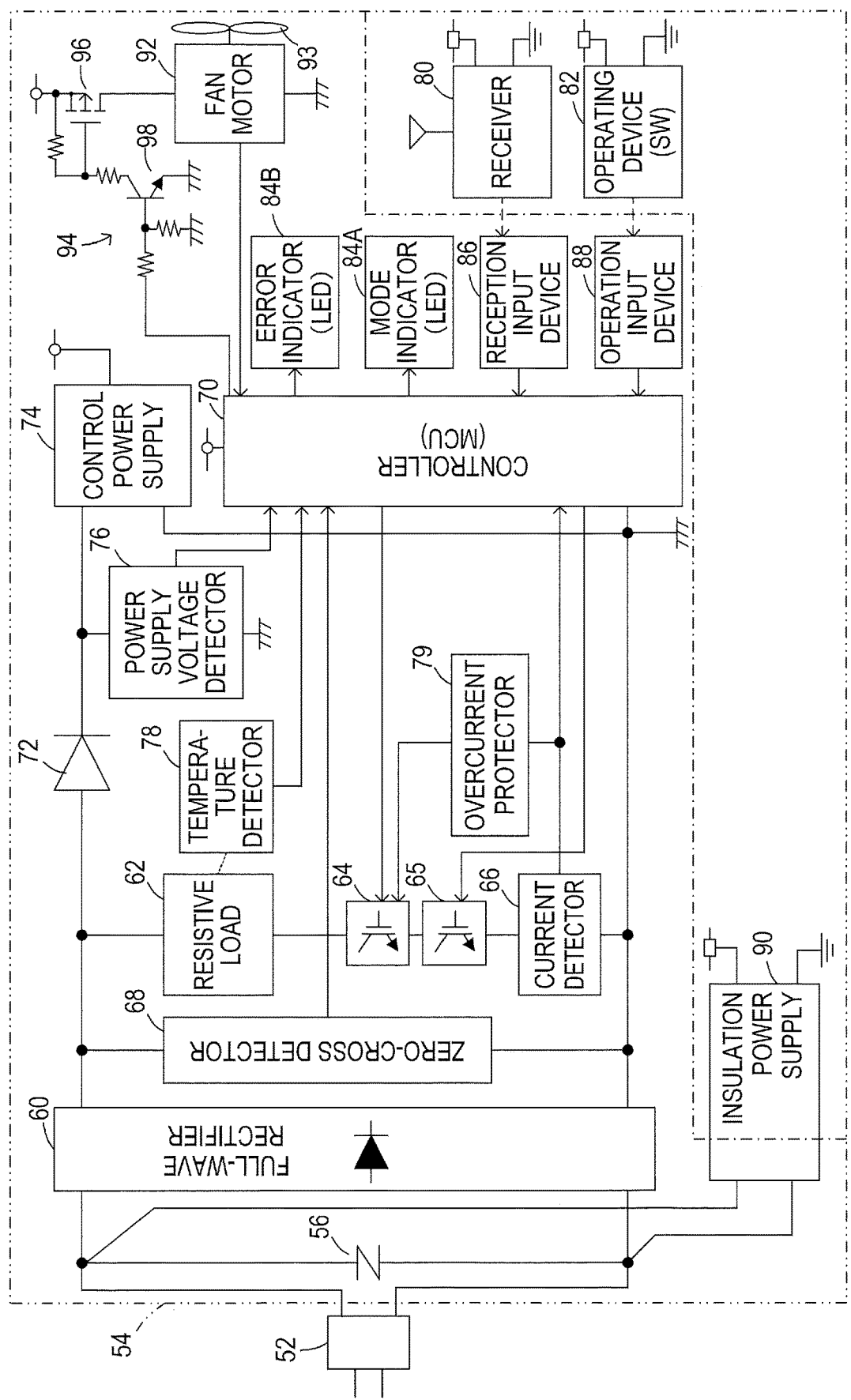
FIG. 7 is a block diagram showing a configuration of an interlocking adapter of a second embodiment.

As shown in FIG. 7, the adapter main body 54 includes a fan motor 92. A cooling fan 93 is integrally assembled to the fan motor 92 of the second embodiment. The adapter main body 54 further includes a drive circuit 94. The drive circuit 94 is configured to receive electric power from the control power supply 74 to drive the fan motor 92.

More specifically, the drive circuit 94 includes a FET 96 provided in a current path to the fan motor 92. The drive circuit 94 further includes a transistor 98. The transistor 98 is coupled to resistors so as to be turned on by a drive signal from the controller 70, set a voltage of a gate of the FET 96 to low level, and turn on the FET 96.

The fan motor 92 is configured to output a pulse signal in accordance with rotation of the fan motor 92. The pulse signal (rotation pulse) is inputted to the controller 70.

In addition to the switching part 64 and the current detector 66, a protection switch 65 is provided in a current path passing through the resistive load 62 from the full-wave rectifier 60. In the second embodiment, the switching part 64 functions as a switch to complete and interrupt the current path passing through the resistive load 62 in order to supply and interrupt the load current (hereinafter, the switching part 64 is referred to as "conduction switch 64"). The protection switch 65 is provided so as to be able to interrupt the current path passing through the resistive load 62 when the conduction switch 64 fails.

The adapter main body 54 includes a mode indicator 84A instead of the indicator 84. The mode indicator 84A is configured to display the operation mode by three LEDs. The adapter main body 54 further includes an error indicator 84B. The error indicator 84B is configured to display errors by lighting one LED.

Figure 8A:
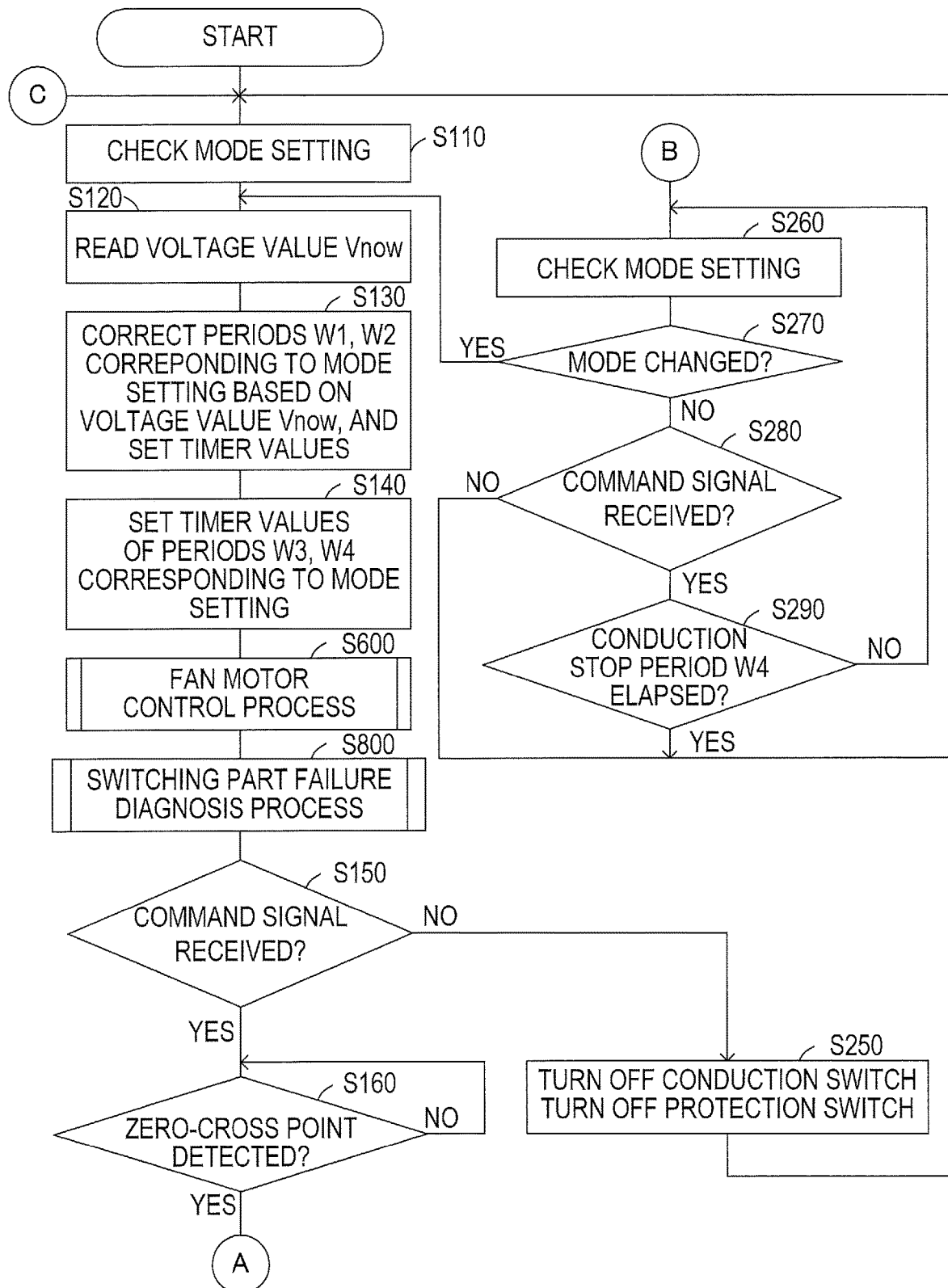
FIG. 8A is a flowchart showing a part of a control process executed by a controller of the second embodiment.

The controller 70 in the second embodiment executes the control process by way of procedures substantially similar to those of the first embodiment. However, since the adapter main body 54 in the second embodiment includes the fan motor 92, the controller 70 in the second embodiment, as shown in FIG. 8A, executes a fan motor control process of S600 after setting the timer value in S140.

After executing the fan motor control process of S600, the controller 70 proceeds to S800 to execute a failure diagnosis process of the switching part including the conduction switch 64 and the protection switch 65, and proceeds to S150.

Figure 8B:
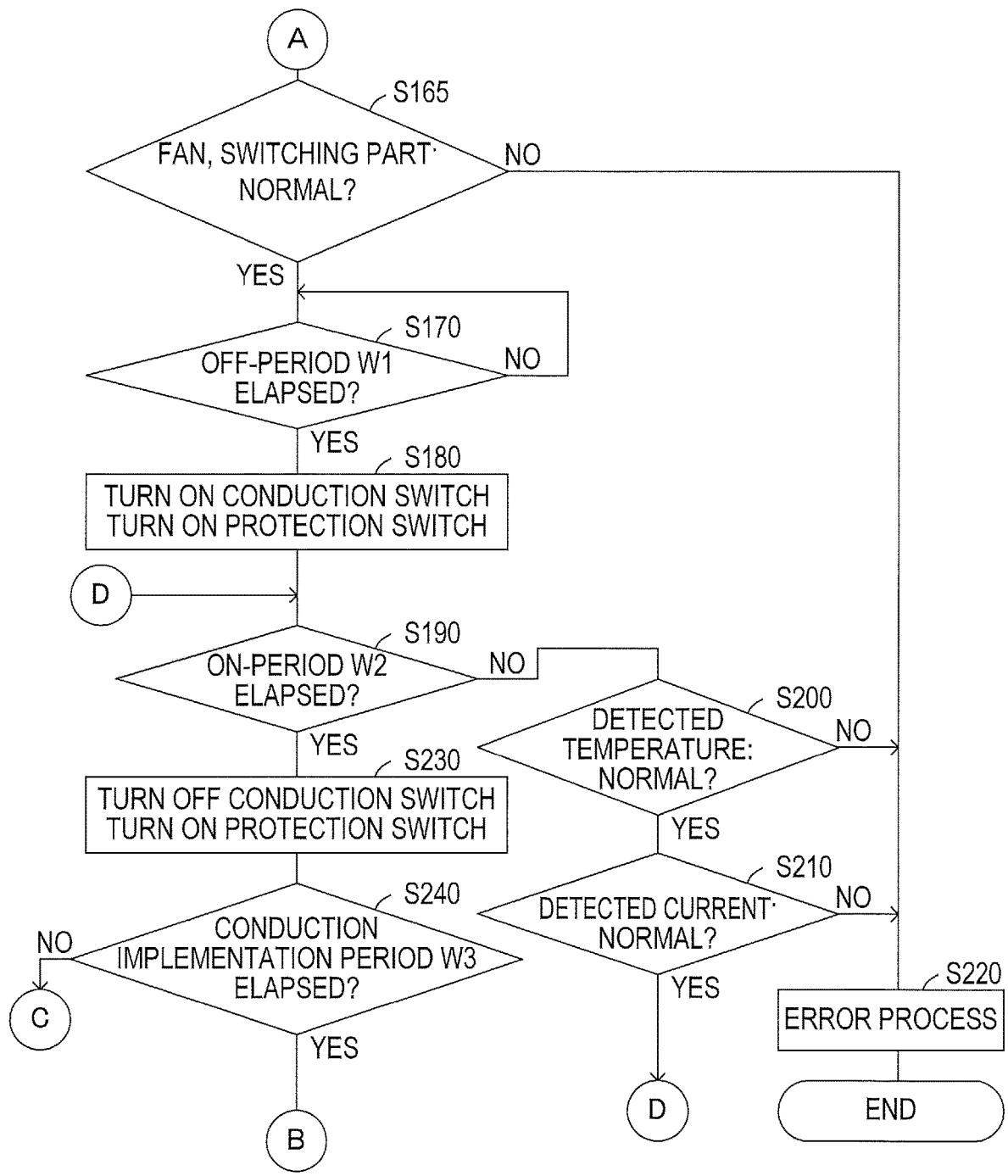
FIG. 8B is a flowchart showing the rest of the control process of the second embodiment.

When it is determined in S160 that the zero-cross point of the AC voltage is detected by the zero-cross detector 68 (S160: YES), the controller 70 proceeds to S165 shown in FIG. 8B, and determines whether failure of the fan motor 92 is detected in the fan motor control process or whether failure of the switching part is detected in the switching part failure diagnosis process.

When it is determined in S165 that the fan motor 92 and the switching part are normal (or in proper condition) (S165: YES), the controller 70 proceeds to S170. When it is determined in S165 that the fan motor 92 or the switching part has failed, the controller 70 proceeds to S220 and lights the LED of the error indicator 84B.

In S220, the controller 70 lights the LED of the error indicator 84B and performs error display also when it is determined in S200 or S210 that the detected temperature or the detected value of electric current are abnormal.

Since the conduction switch 64 and the protection switch 65 are provided in the current path passing through the resistive load 62, the controller 70, when controlling supply of the load current in S180 and S230, holds the protection switch 65 to be on-state and turns on and off the conduction switch 64.

When it is determined in S150 that the interlocking command signal is not received by the receiver 80 (S150: NO), the controller 70 in S250 turns off the conduction switch 64 and the protection switch 65 and proceeds to S110.

The fan motor control process executed in S600 will be described.

Figure 9A:
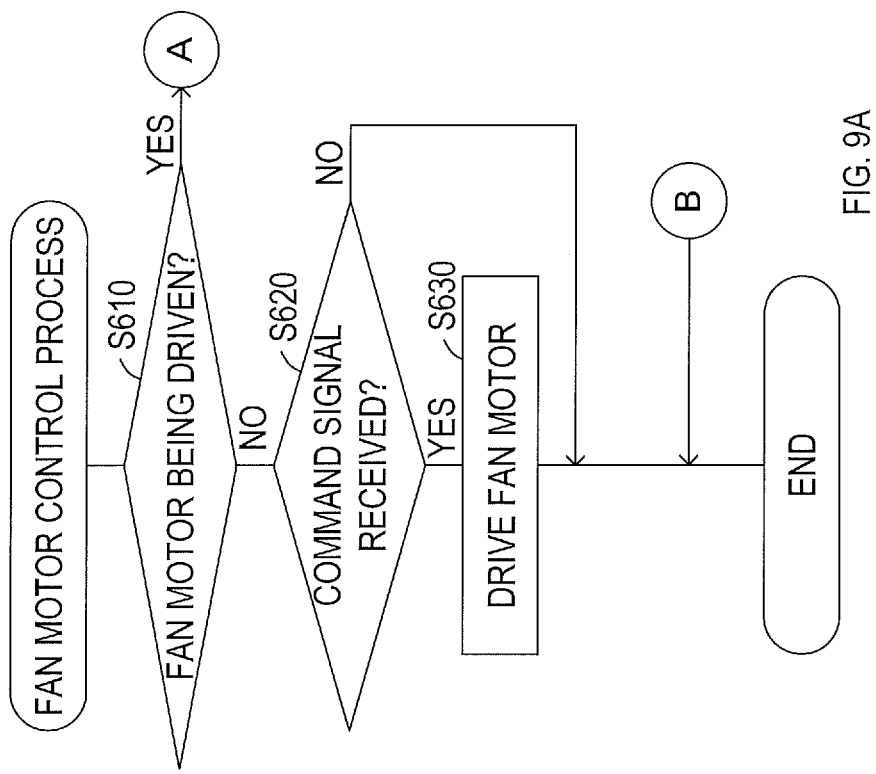
FIG. 9A is a flowchart showing a part of a fan motor control process shown in FIGS. 8A and 8B.
Figure 9B:
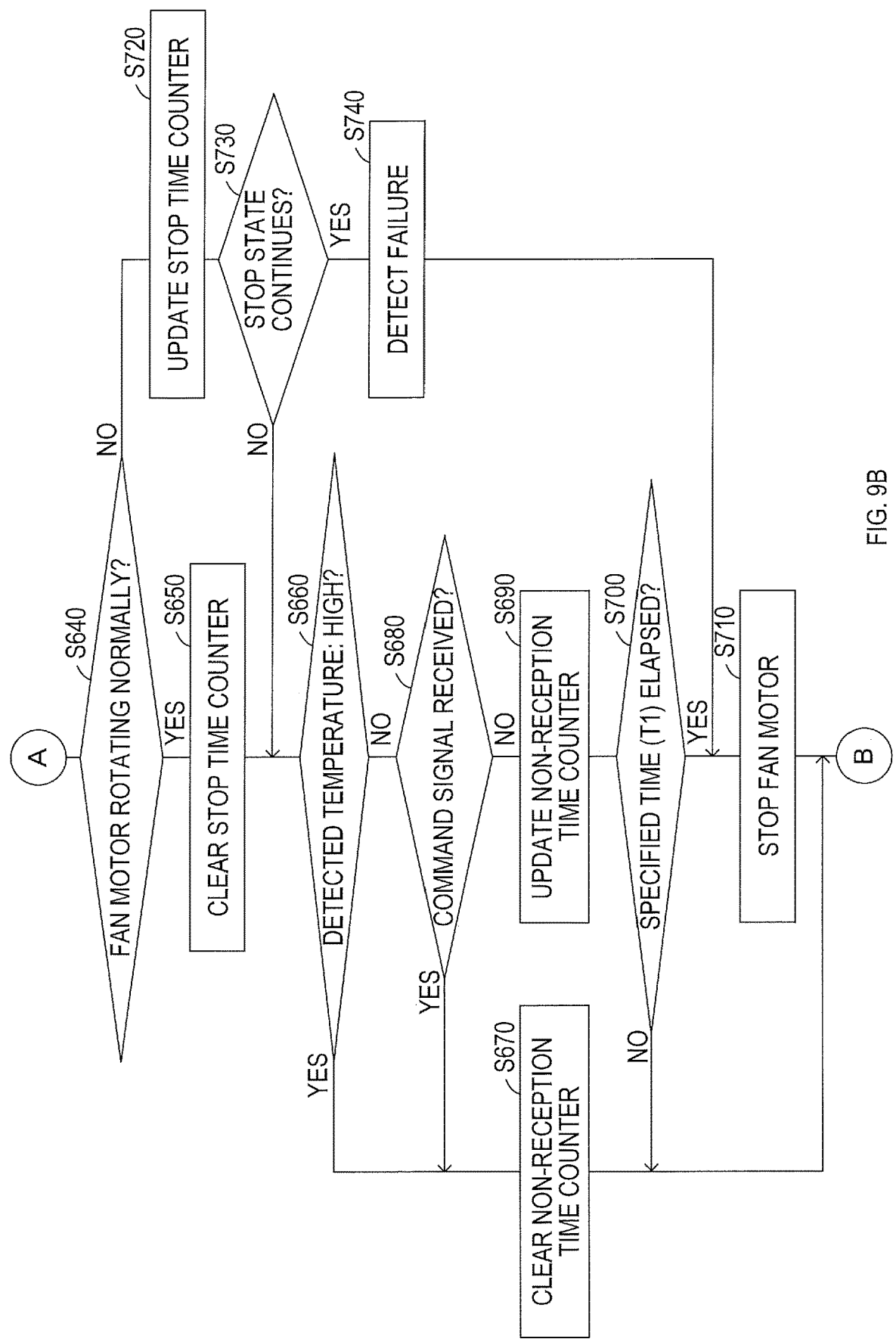
FIG. 9B is a flowchart showing the rest of the fan motor control process.

As shown in FIGS. 9A and 9B, in the fan motor control process, the controller 70 determines first in S610 whether the fan motor 92 is being driven. If the fan motor 92 is not being driven (S610: NO), the controller 70 proceeds to S620 and determines whether the interlocking command signal is received by the receiver 80.

When it is determined in S620 that the interlocking command signal is received (S620: YES), the controller 70 in subsequent S630 drives the fan motor 92 and temporarily terminates the fan motor control process. When it is determined in S620 that the interlocking command signal is not received (S620: NO), the controller 70 immediately terminates the fan motor control process.

When it is determined in S610 that the fan motor 92 is being driven (S610: YES), the controller 70 proceeds to S640, and determines whether the fan motor 92 is rotating normally based on the rotation pulse inputted from the fan motor 92.

When it is determined in S640 that the fan motor 92 is rotating normally (S640: YES), the controller 70 proceeds to S650, clears a stop time counter that measures stop time of the fan motor 92, and proceeds to S660. In S660, the controller 70 determines whether a temperature of the resistive load 62 detected by the temperature detector 78 is a high temperature equal to or higher than a specified temperature.

When it is determined in S660 that the resistive load 62 has the high temperature (S660: YES), the controller 70 proceeds to S670, and clears a non-reception time counter for measuring a non-reception time during which the interlocking command signal is not received. When completing clearing of the non-reception time counter, the controller 70 temporarily terminates the fan motor control process. When it is determined in S660 that the temperature of the resistive load 62 is not high (S660: NO), the controller 70 proceeds to S680, and determines whether the interlocking command signal is received by the receiver 80.

When it is determined in S680 that the interlocking command signal is received (S680: YES), the controller 70 proceeds to S670, clears the non-reception time counter, and temporarily terminates the fan motor control process. When it is determined in S680 that the interlocking command signal is not received (S680: NO), the controller 70 proceeds to S690, updates (increments) the non-reception time counter, and proceeds to S700.

In S700, the controller 70 determines whether the non-reception time is equal to a specified time (T1) or more, based on a value of the non-reception time counter updated in S690. If the non-reception time in S700 is equal to the specified time (T1) or more (S700: YES), then the controller 70 proceeds to S710, stops driving of the fan motor 92, and temporarily stops the fan motor control process. If the non-reception time in S700 is smaller than the specified time (T1) (S700: NO), then the controller 70 temporarily terminates the fan motor control process immediately.

The non-reception time counter is cleared not only when the interlocking command signal is received as mentioned above but also when the resistive load 62 has the high temperature. Therefore, the non-reception time counter is not updated (incremented) until the resistive load 62 has a temperature lower than the specified temperature.

Thus, the fan motor 92 continues to rotate when the temperature of the resistive load 62 is high. When the temperature of the resistive load 62 is lowered and time during which the interlocking command signal is not received elapses for the specified time (T1) or more, the fan motor 92 is stopped.

When it is determined in S640 that the fan motor 92 is not rotating normally (in other words, the fan motor 92 is stopped, or is rotating at an extremely low speed) (S640: NO), the controller 70 proceeds to S720, and updates (increments) the stop time counter.

In subsequent S730, the controller 70 determines whether a stop state of the fan motor 92 (more particularly, state in which the fan motor 92 is stopped or is rotating at an extremely low speed) continues based on the value of the stop time counter. If the stop state does not continue (S730: NO), then the controller 70 proceeds to S660.

On the other hand, when it is determined that the stop state continues (S730: YES), the controller 70 proceeds to S740, detects failure of the fan motor 92, stores the detected failure, and proceeds to S710.

In other words, the controller 70, when the stop state continues for a given length of time or more, determines that the fan motor 92 has failed and stops driving of the fan motor 92.

In the fan motor control process as such, the controller 70, when the interlocking command signal is received by the receiver 80, starts driving of the fan motor 92. Thereafter, when the interlocking command signal is no longer received and the stop state continues for the specified time (T1) or more, the controller 70 stops driving of the fan motor 92. When the temperature of the resistive load 62 is high, the controller 70 continues driving of the fan motor 92. When the temperature of the resistive load 62 is lowered, and the specified time (T1) or more elapses, the controller 70 stops driving of the fan motor 92.

Thus, according to the second embodiment, when electric current is supplied to the resistive load 62 for interlocking operation, it is possible to inhibit increase in temperature of the adapter main body 54 due to heat generation of the resistive load 62. Further, it is possible to inhibit increase in temperature of the adapter main body 54 due to heat of the resistive load 62, after driving of the fan motor 92 is stopped.

The switching part failure diagnosis process executed in S800 will be described.

Figure 10:
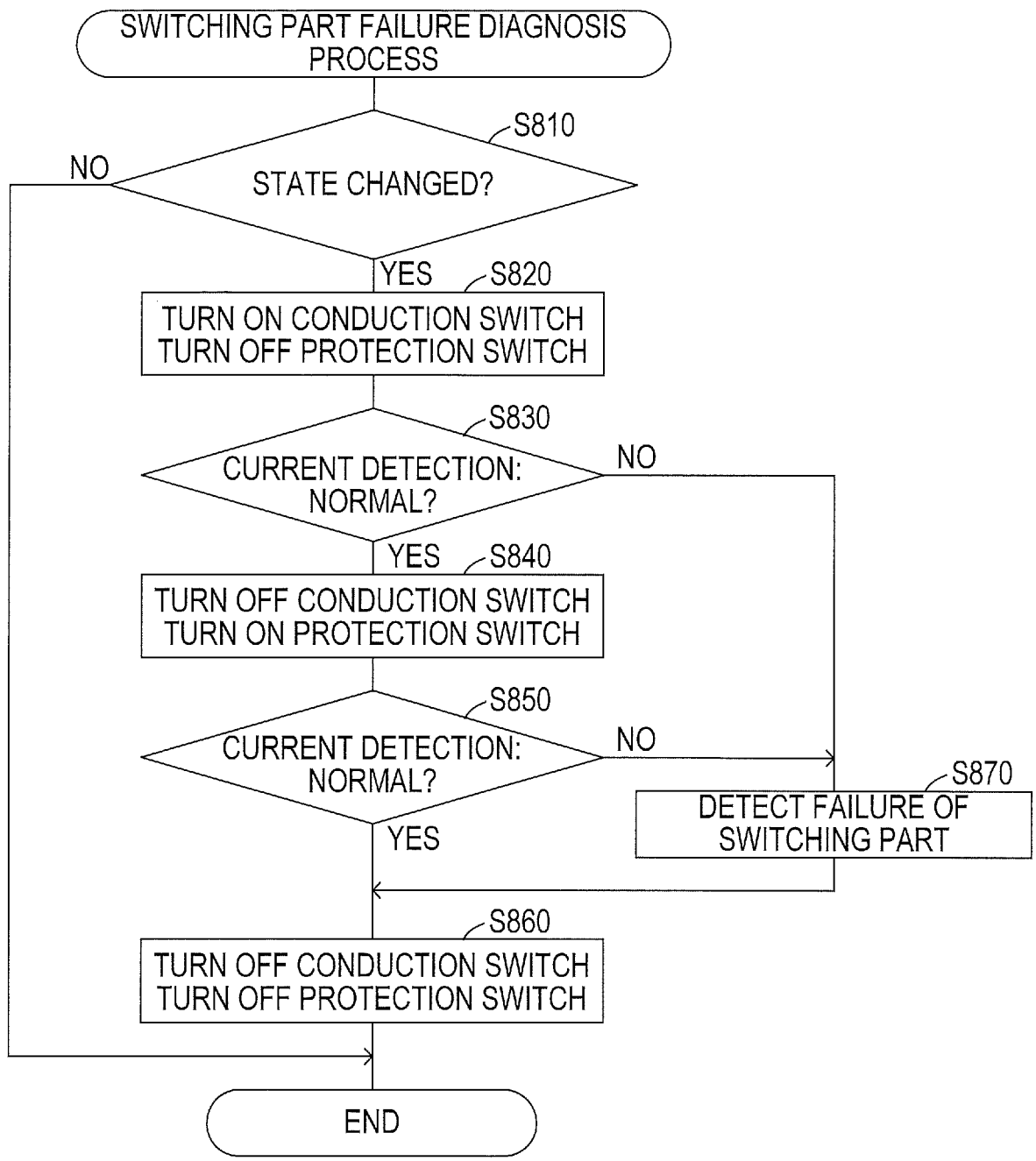
FIG. 10 is a flowchart showing a detail of a switching part failure diagnosis process shown in FIG. 8A.

As shown in FIG. 10, in the switching part failure diagnosis process, the controller 70 determines in S810 whether the interlocking command signal is received by the receiver 80, and a change of state has occurred from a non-reception state of the interlocking command signal to a received state of the interlocking command signal.

When it is determined in S810 that a change of state has occurred (S810: YES), the controller 70 proceeds to S820. When it is determined in S810 that a change of state has not occurred (S810: NO), the controller 70 terminates the switching part failure diagnosis process.

In S820, the controller 70 sets the conduction switch 64 to the on-state, and the protection switch 65 to the off-state, and proceeds to S830. In S830, the controller 70 determines whether detection of electric current by the current detector 66 is normal (or proper), and determines whether the protection switch 65 set to the off-state is interrupting the current path of the load current normally.

When it is determined in S830 that the detection of electric current by the current detector 66 is normal (S830: YES), the controller 70 proceeds to S840, sets the conduction switch 64 to the off-state and the protection switch 65 to the on-state, and proceeds to S850. In S850, the controller 70 determines whether the detection of electric current by the current detector 66 is normal, and whether the conduction switch 64 set to the off-state is interrupting the current path of the load current normally.

When it is determined in S850 that the detection of electric current by the current detector 66 is normal (S850: YES), the controller 70 determines that both the conduction switch 64 and the protection switch 65 are normal (or in proper condition), and proceeds to S860. In S860, the controller 70 sets the conduction switch 64 and the protection switch 65 to the off-state, and terminates the switching part failure diagnosis process.

When it is determined in S830 or S850 that detection of the electric current by the current detector 66 is abnormal (or improper) (S830 or S850: NO), there is a possibility that the protection switch 65 or the conduction switch 64 has failed.

The controller 70 proceeds to S870, stores the failure of the switching part, and proceeds to S860.

In the switching part failure diagnosis process, the controller 70 sets one of the conduction switch 64 and the protection switch 65 to the off-state and determines whether the load current is detected by the current detector 66, thereby detecting the failure of the switching part set to the off-state.

When detecting the failure of the conduction switch 64 or the protection switch 65 in the switching part failure diagnosis process, or detecting the failure of the fan motor 92 in the fan motor control process, the controller 70 determines occurrence of failure in the determination process of S165, and prohibits supply of electric current to the resistive load 62. In this case, the controller 70 performs error display to the error indicator 84B in the error process of S220.

Thus, the user, when it is not possible to operate the dust collector 20 in an interlocking manner, can confirm that the cause is the failure of the interlocking adapter 50 from the error display of the error indicator 84B.

When performing the error display in the error process in S220, the controller 70 may not only merely stop supply of electric current to the resistive load 62, but also may continue the error display during reception of the interlocking command signal by the receiver 80. Alternatively, the controller 70 may continue error display until elapse of the given length of time from when the interlocking command signal is no longer received by the receiver 80.

If the error display continues as mentioned above, then failure of the interlocking adapter 50 can be notified to the user even when the user is away from the interlocking adapter 50 and cannot immediately check the error display. The controller 70, when performing the error display in S220, may notify the error by sound such as sounding a buzzer at the same time.

In the error process of S220, the controller 70, depending on detail of the detected failure, may notify the user of the detail of the failure such as by changing a display manner of the error or sounding pattern of the buzzer. Specifically, a notification manner of error may be changed depending on the detail of the failure. For example, failure of the fan may be notified by turning on a red light or sounding of the buzzer, and failure of the switch may be notified by flashing a red light or intermittent sounding of the buzzer. As a result, the user can detect the detail of the failure.

The controller 70 may execute the error process of S220 also when the power supply voltage detected by the power supply voltage detector 76 is out of a guaranteed operating range, or when the frequency of the power supply voltage is out of the guaranteed operating range.

The controller 70 may not only perform the error display in the error process of S220 but also report error to the tool (for example, circular saw 10) by wireless communication. In this case, it is possible to notify the user of the error via the tool. The user can more reliably detect the failure of the interlocking adapter 50 by the notification.

A structure of the interlocking adapter 50 (specifically, adapter main body 54) of the second embodiment will be described.

As shown in FIGS. 11A to 11E, the adapter main body 54 includes a rectangular housing 100. The housing 100 houses the aforementioned components including the resistive load 62 and the fan motor 92.

The housing 100 includes an upper case 101 and a lower case 102, and is assembled as a single housing having an internal space. Specifically, an opening portion of the upper case 101 is overlapped with an opening portion of the lower case 102, and the upper case 101 is coupled to the lower case 102 by screws.

Figure 11:
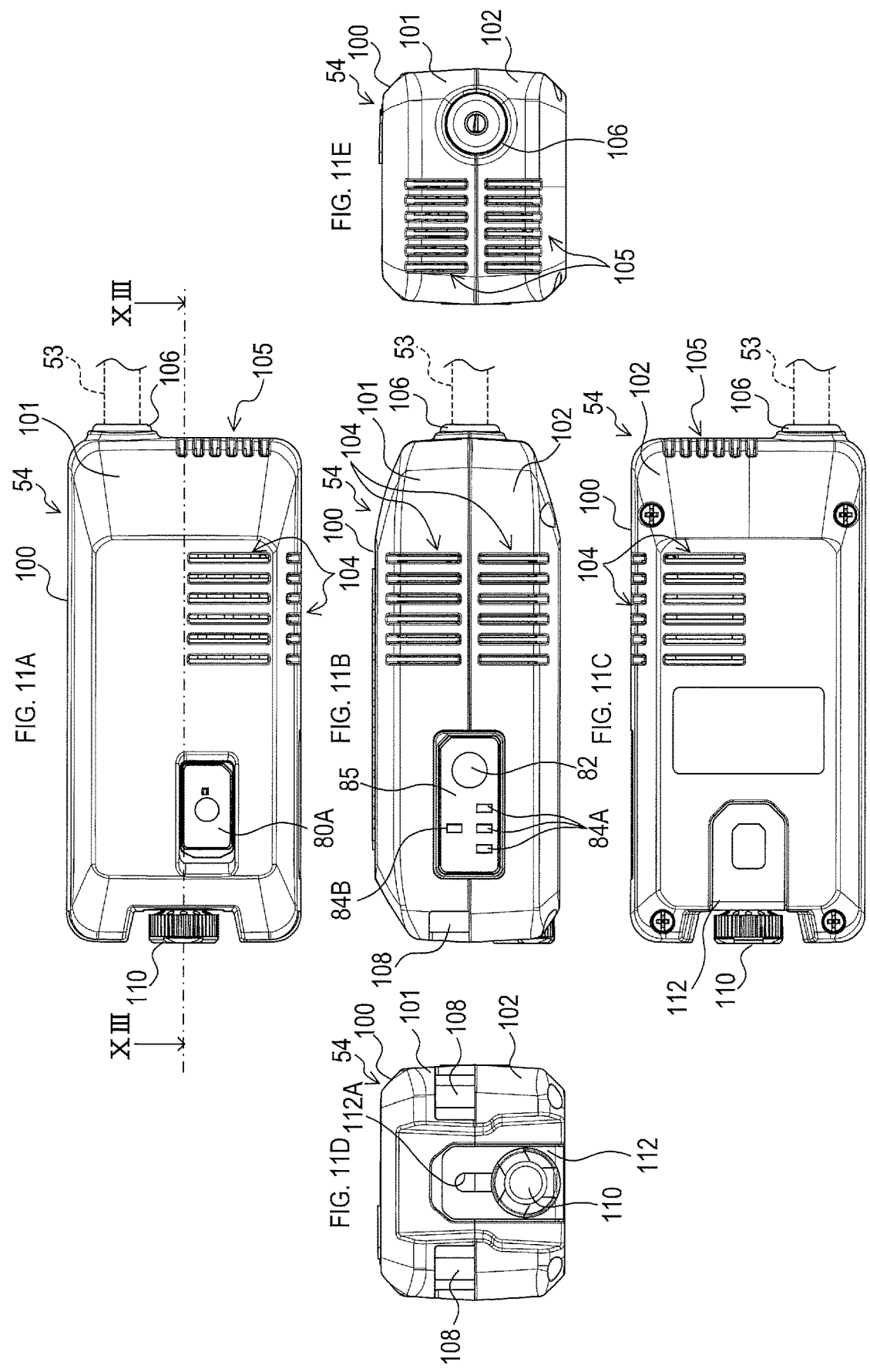

As shown in FIG. 11A, an outer wall surface of the upper case 101 facing the lower case 102 is provided with a protective cover 80A which covers the receiver 80 housed in the housing 100.

Figure 12:
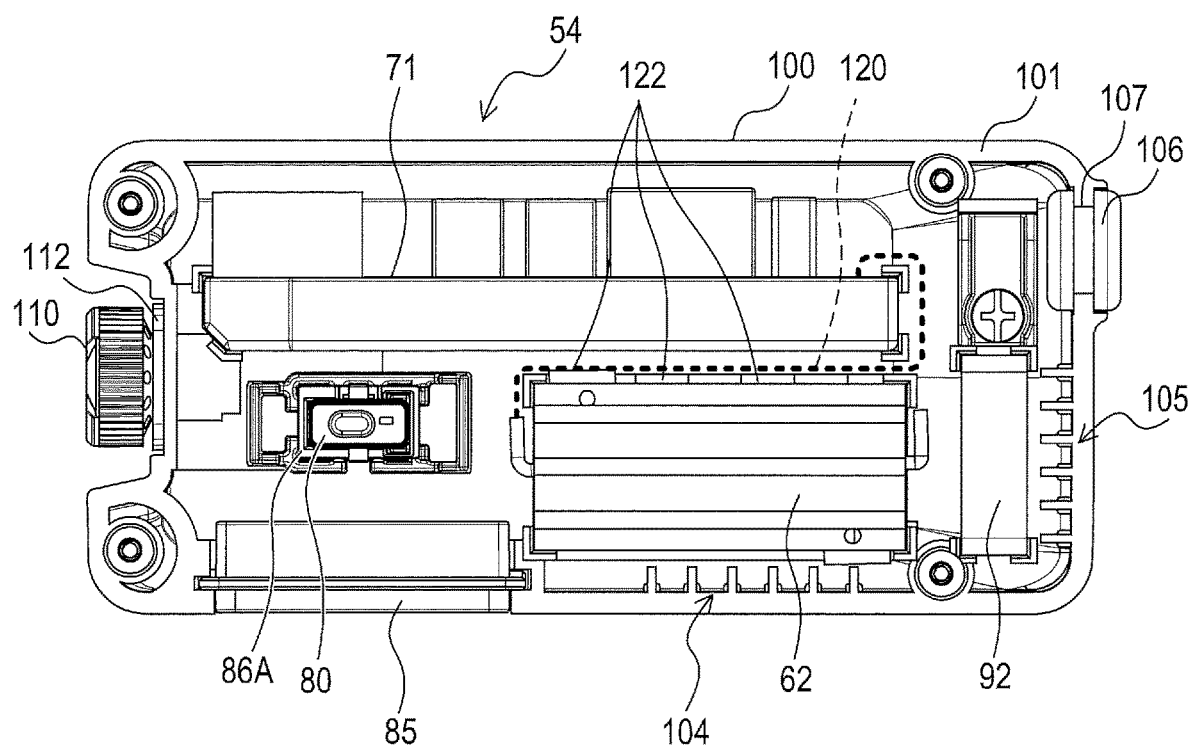
FIG. 12 is a plan view of the interlocking adapter showing a state in which an upper housing of the interlocking adapter is removed.

The receiver 80, as shown in FIG. 12, is coupled to a connector 86A of the reception input device 86 inside the housing 100. Therefore, the user can open the protective cover 80A, and couple the receiver 80 to the connector 86A or detach the receiver 80 from the connector 86A.

As shown in FIG. 11B, the housing 100 is provided with an operation panel 85. The operation panel 85 is positioned on the lower side in FIG. 11A, and provided on a side wall along a longitudinal direction of the housing 100. The operation panel 85 is provided with the three LEDs included in the mode indicator 84A. The operation panel 85 is provided with the one LED included in the error indicator 84B. The operation panel 85 is further provided with the switch included in the operating device 82.

The receiver 80 and the operation panel 85 are arranged at a position biased in one direction (left direction in FIG. 11B) from a longitudinal center portion of the housing 100. As shown in FIGS. 11A to 11C, the housing 100 includes intake ports 104 for taking external air into the housing 100 on three outer wall surfaces. These three outer wall surfaces include an outer wall surface provided with the receiver 80, an outer wall surface provided with the operation panel 85, and an outer wall surface of the lower case 102 facing the upper case 101.

The intake ports 104 are arranged at a position biased on an opposite side (right direction in FIGS. 11A to 11C) of the receiver 80 and the operation panel 85 from the longitudinal center portion of the housing 100, in the corresponding outer wall surface.

This is because the resistive load 62 is arranged, inside the housing 100, at a position biased to the opposite side of the receiver 80 and the operation panel 85 from the longitudinal center portion of the housing 100, as shown in FIG. 12.

In other words, in the second embodiment, the resistive load 62 inside the housing 100 is surrounded from three directions by the intake ports 104 provided on the aforementioned three outer wall surfaces of the housing 100. As a result, external air taken inside the housing 100 from the intake ports 104 by the rotation of the fan motor 92 directly blows to the resistive load 62.

As shown in FIG. 11E, the side wall on one end side in the longitudinal direction (one end side in the right direction in FIGS. 11A to 11C) provided with the intake ports 104 in the housing 100 includes exhaust ports 105 for discharging air inside the housing 100 to outside. The fan motor 92 is arranged inside the housing 100 between the resistive load 62 and the exhaust ports 105.

External air sucked from the intake ports 104 by the rotation of the fan motor 92 cools the resistive load 62 inside the housing 100, passes the fan motor 92, and is then discharged from the exhaust ports 105.

Therefore, the housing 100 can inhibit high-temperature air deriving from heat generation of the resistive load 62 from staying in the housing 100, and can efficiently dissipate the resistive load 62.

In the housing 100, since the intake ports 104 are provided on the aforementioned three outer wall surfaces, it is inhibited that all of the intake ports 104 are closed when the interlocking adapter 50 is attached to the electric apparatus such as the dust collector 20. Therefore, according to the second embodiment, it is possible to secure a path for taking external air into the housing 100, and cool the resistive load 62.

In the housing 100, the side wall including the exhaust ports 105 is provided with an insertion hole 107 shown in FIG. 12 for inserting the power cord 53. A protective member 106 for protecting and fixing the power cord 53 is fitted in the insertion hole 107.

The power cord 53 is drawn from the insertion hole 107 of the housing 100 in a state fixed to the housing 100 by the protective member 106. Such an arrangement of the power cord 53 can inhibit an object existing near the exhaust port 105 from closing the exhaust port 105.

In other words, when an object is at a position facing the exhaust port 105, the object abuts on the power cord 53 before closing the exhaust port 105. As a result, it is possible to inhibit the exhaust port 105 from being closed by the object.

According to the second embodiment, it is possible to secure the exhaust ports 105, and exhaust paths of air inside the housing 100, and inhibit cooling effect of the resistive load 62 from being impaired.

As shown in FIG. 12, inside the housing 100, the circuit board 71, separate from the resistive load 62, is housed. Various electronic components such as the controller 70 are mounted on the circuit board 71. Therefore, inside the housing 100, the resistive load 62 is coupled to the circuit board 71 via a lead wire 120 shown in a dotted line in FIG. 12.

When the lead wire 120 is in contact with the resistive load 62, coating of the lead wire 120 may deteriorate due to heat of the resistive load 62. When the coating of the lead wire 120 deteriorates, the current path of the load current may contact surrounding conductors and the interlocking adapter 50 may fail.

Figure 13:
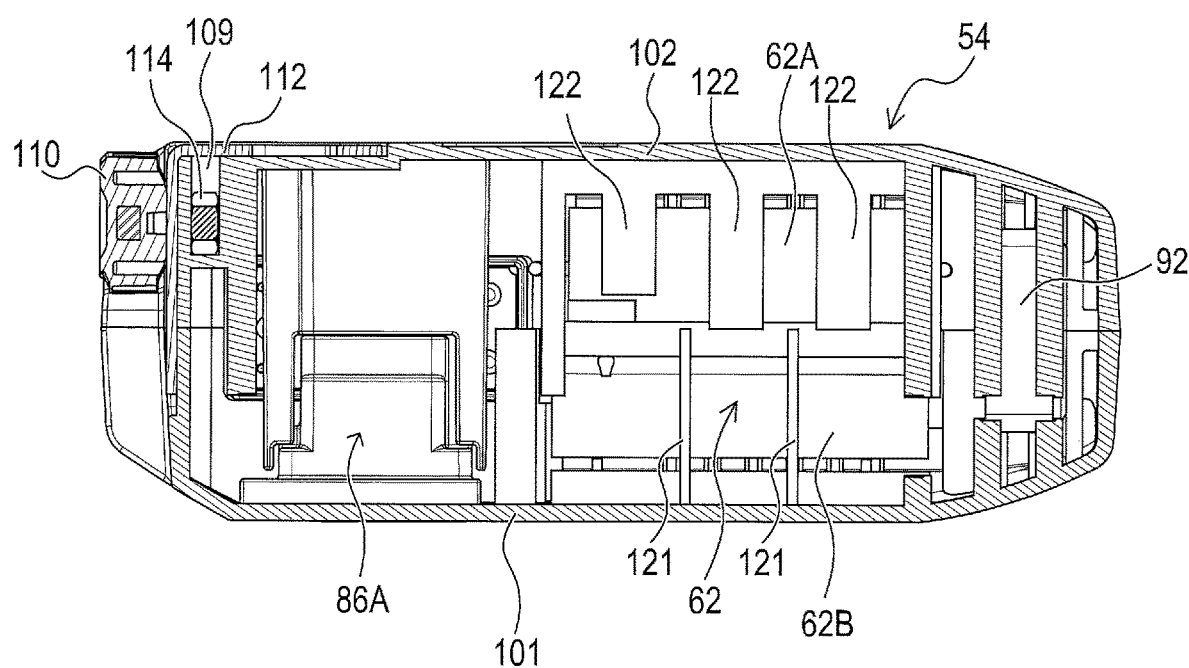
FIG. 13 is a sectional view taken along a line XIII-XIII in FIG. 11.

In the second embodiment, as shown in FIG. 13, the resistive load 62 is provided with a resistor 62A. The resistive load 62 is further provided with a heat sink 62B for heat dissipation. In the resistive load 62 as such, when the coating of the lead wire 120 deteriorates due to heat of the resistive load 62, the current path of the load current may contact the heat sink 62B, and leads to failure of the interlocking adapter 50.

In order to avoid such failures, inner walls of the lower case 102 and the upper case 101 facing each other are provided with a rib 121 and a rib 122, respectively. These ribs 121, 122 inhibit or restrain the lead wire 120 arranged between the circuit board 71 and the resistive load 62 from coming into contact with the resistive load 62.

The ribs 121, 122, if formed of a single plate, can reliably inhibit or restrain the lead wire 120 from coming into contact with the resistive load 62. However, in this case, a flow path of the air around the resistive load 62 is interrupted, and the cooling effect can be impaired. Therefore, each of the ribs 121, 122 of the second embodiment is cut out in part and separated into two or more portions. With such ribs 121, 122, air can flow around the resistive load 62, and the resistive load 62 can be cooled.

As shown in FIGS. 11D, 12 and 13, a hook 112 is provided on the side wall of the housing 100 on the opposite side of the side wall provided with the exhaust ports 105. The hook 112 is formed into an L-shape. The hook 112 is fixed to the aforementioned side wall via the screw 110. The screw 110 is configured such that the user grips the head of the screw 110 and rotates the screw 110.

The hook 112 of the second embodiment includes an L-shaped plate. A first portion of this plate includes an insertion hole 112A for inserting the screw 110. A second portion of the plate faces the bottom of the housing 100. The insertion hole 112A may be a long hole. When the insertion hole 112A is a long hole, the first portion can be slid so as to bring the second portion into contact with the housing 100 or separate the second portion from the housing 100 in a state in which the first portion is fixed to the side wall of the housing 100 via the screw 110.

Figures 14A, 14B:
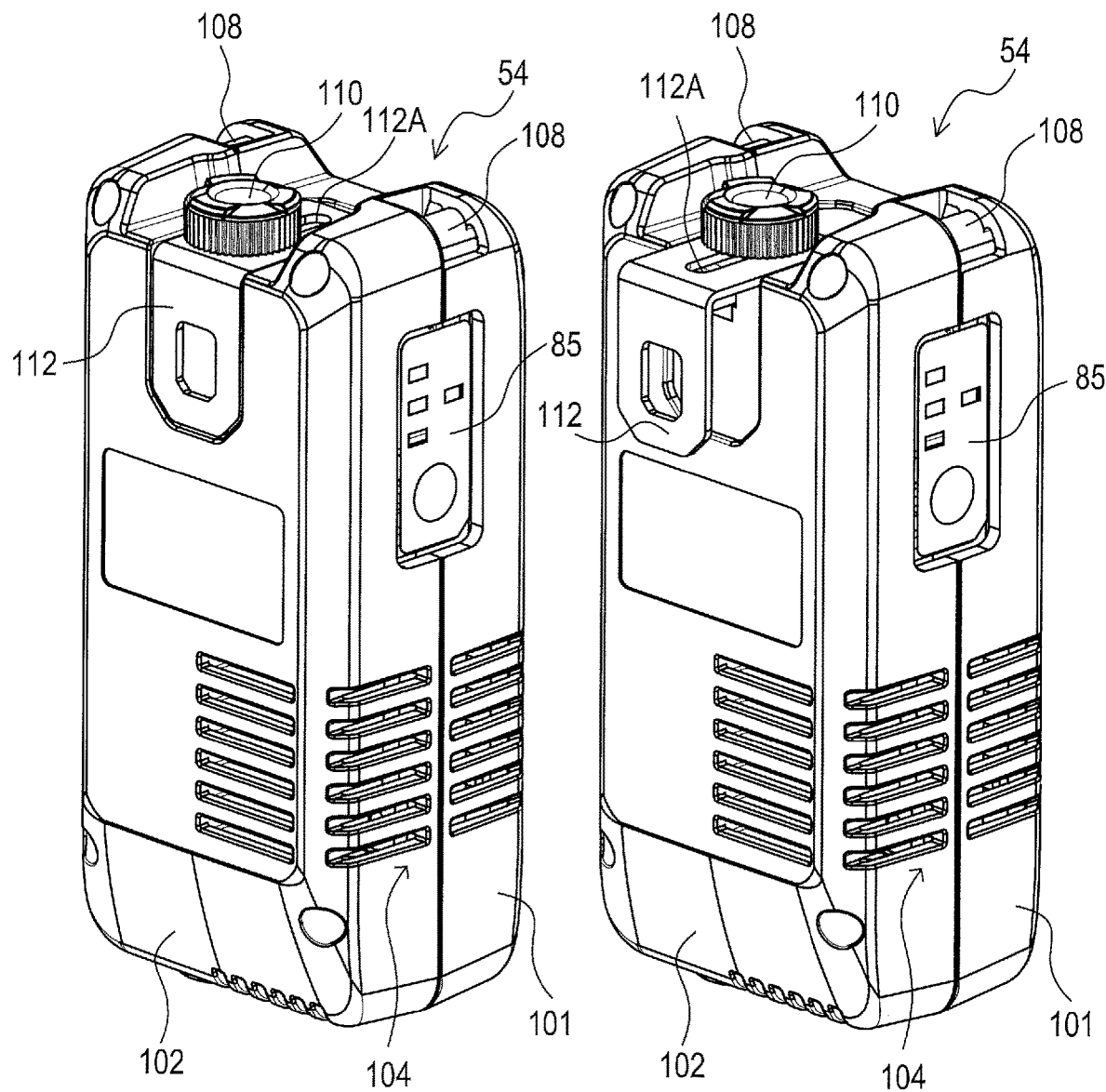

The hook 112 configured as such can be fixed along the outer wall of the housing 100, as shown in 14A, or can be fixed in a state pulled out from the housing 100, as shown in FIG. 14B.

Figure 15:
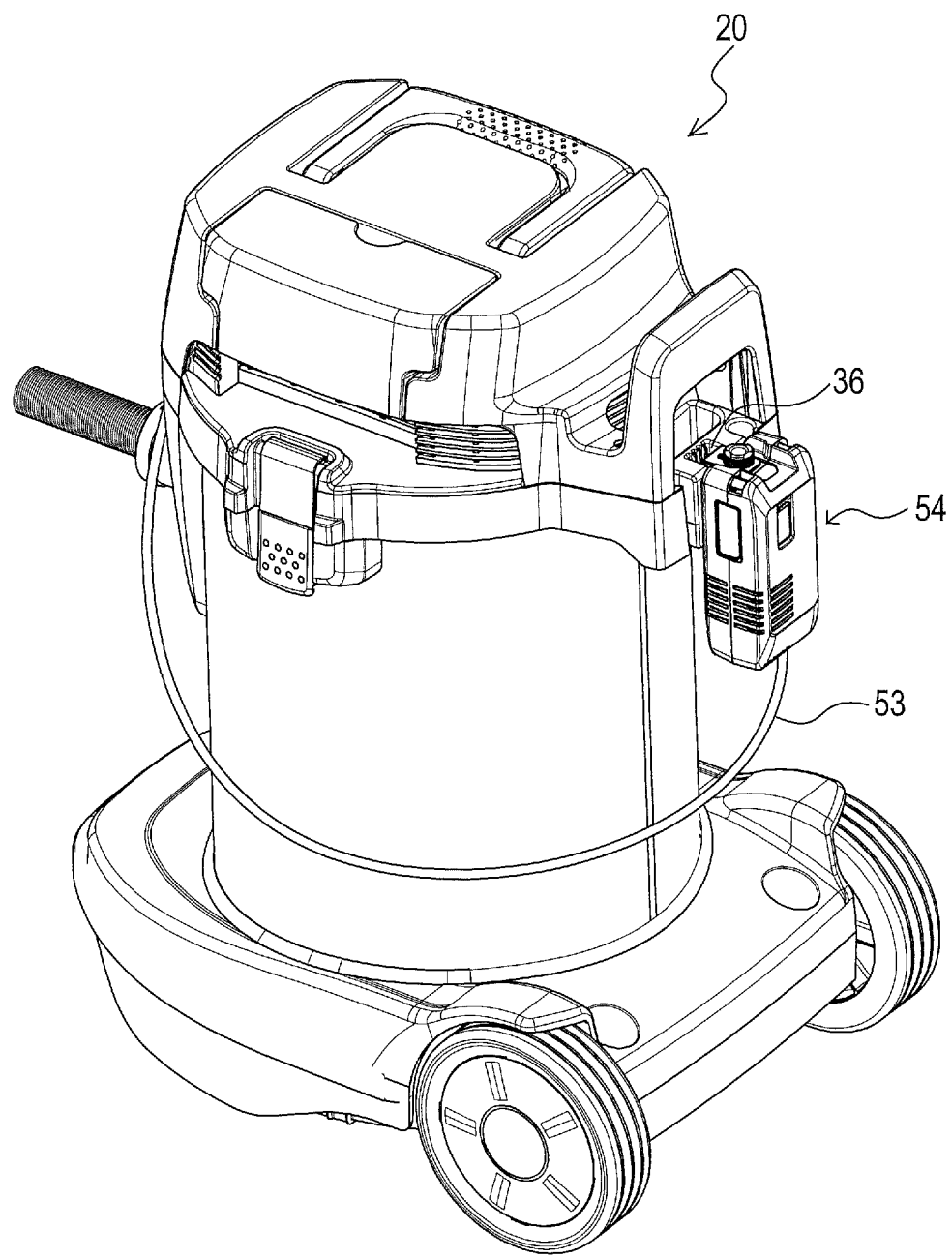
FIG. 15 is a perspective view of the interlocking adapter of the second embodiment, showing a state in which the interlocking adapter is attached to a dust collector.

In the state in which the hook 112 is pulled out from the housing 100, the adapter main body 54 may be fixed to a desired position by hooking the hook 112 on the hole or a protrusion. For example, as shown in FIG. 15, in case that a hole 36 is provided by which the hook 112 can be hooked on the dust collector 20, the adapter main body 54 can be attached to the dust collector 20 by hooking the hook 112 pulled out from the housing 100 on the hole 36.

As shown in FIG. 13, the screw 110 is screwed into a nut 114 provided in the housing 100 and fastened, so that the hook 112 can be fixed to the housing 100.

Assuming that the nut 114 is provided inside the housing 100, there is a possibility that the nut 114 may fall out inside the housing 100 when the screw 110 is detached from the nut 114. When the fallen nut 114 moves in the housing 110, the aforementioned circuit inside the housing 100 can be short-circuited. Therefore, it may become necessary to disassemble the housing 100 and perform repair work.

Thus, in the second embodiment, as shown in FIG. 13, the housing 100 is provided with a gap 109 through which the nut 114 can be inserted from outside the housing 100. The nut 114 can be inserted into the gap 109 and fixed to the housing 100.

As a result, when the screw 110 is detached from the nut 114, necessity of performing troublesome repair work such as disassembling the housing 100 can be eliminated or reduced.

The gap 109 is covered with the hook 112 assembled to the housing 100 by the screw 110. Such an arrangement of the gap 109 can inhibit the nut 114 from falling out from the gap 109 when the screw 110 is detached from the nut 114.

Figure 16:
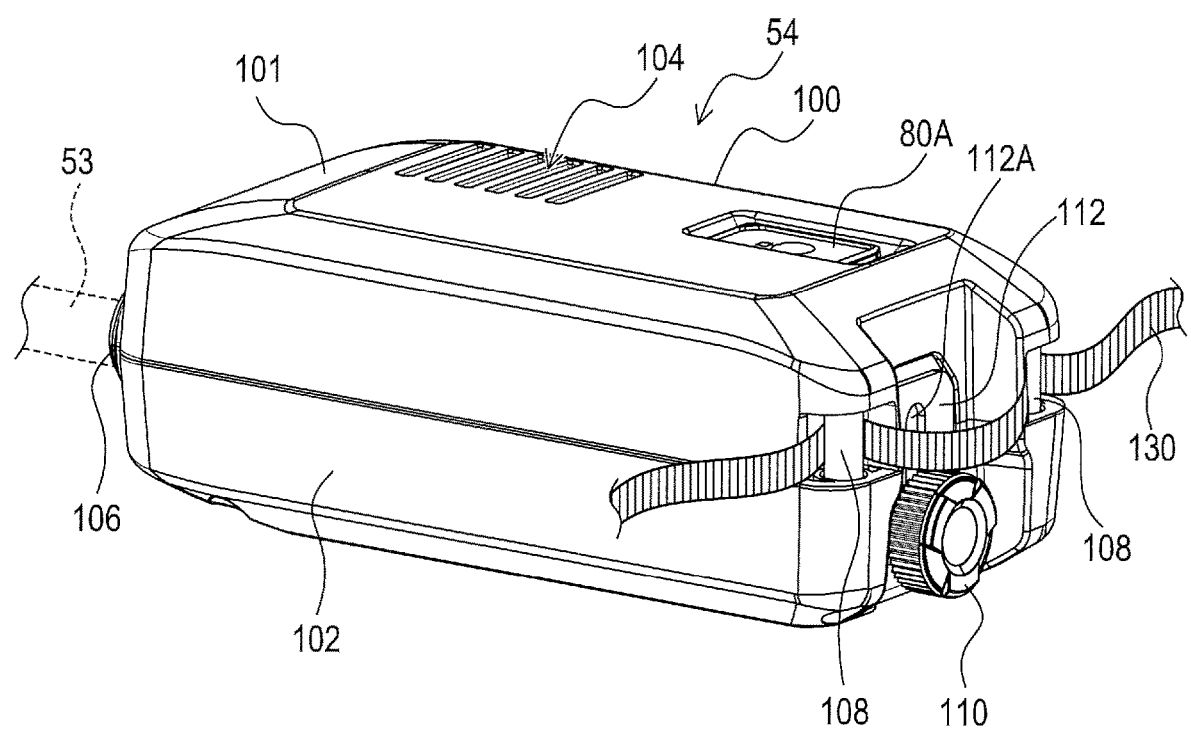
FIG. 16 is a perspective view of the interlocking adapter of the second embodiment, showing a state in which a fixing band is attached to the interlocking adapter.

A rod-like coupling portion 108 for inserting the screw coupling the upper case 101 and the lower case 102 is provided on each side of the housing 100 interposing the screw 110 and the hook 112 therebetween. As shown in FIG. 16, a gap through which a fixing band 130 can be inserted is formed between the housing 100 and each coupling portion 108.

Therefore, it is possible to pass the band 130 having a desired length through each gap between the respective coupling portions 108 and the housing 100. Further, it is possible to attach the adapter main body 54 to the electric apparatus such as the dust collector 20 via the band 130. Moreover, since the user can use the band 130 to carry the interlocking adapter 50 to a desired place, usability of the interlocking adapter 50 can be improved.

As mentioned above, since the operation panel 85 including the LEDs of the mode indicator 84A and the error indicator 84B and the switch of the operating device 82 is arranged on one end side in the longitudinal direction of the housing 100, the user can operate the operating device 82 while gripping the adapter main body 54.

Operation of the operating device 82 by the user switches the mode setting of the interlocking adapter 50, changes the lighting state of the LEDs of the mode indicator 84A, and displays the switched mode setting.

Therefore, it may be desirable for the user to grip the adapter main body 54 so as not to hide the LEDs of the mode indicator 84A with the hand of the user when operating the operating device 82. Further, it may be desirable for the user to grip the adapter main body 54 so as not to hide the LED of the error indicator 84B with the hand of the user.

In consideration of the above, in the operation panel 85 of the second embodiment, as shown in FIG. 11B, the switch of the operating device 82 is arranged at a position close to the center in the longitudinal direction of the housing 100. The LEDs of the mode indicator 84A and the LED of the error indicator 84B are arranged at end sides in the longitudinal direction of the housing 100.

Therefore, the user can easily confirm the lighting state of the LEDs of the mode indicator 84A and the LED of the error indicator 84B while gripping the adapter main body 54. As a result, usability of the interlocking adapter 50 can be improved.

The embodiments and the variations of the present disclosure have been described in the above. The present disclosure is not limited to the aforementioned embodiments or variations, and can be practiced in various modifications.

For example, in the aforementioned embodiments, one example of the electric apparatus which implements interlocking operation using the interlocking adapter 50 is the dust collector 20, and one example of the working machine that operates in an interlocking manner with the dust collector 20 is the circular saw 10.

However, the interlocking adapter 50 of the present disclosure can be utilized in the same manner as in the aforementioned embodiments in any electric apparatuses configured to detect the load current flowing through the electric outlet 32 and start their operations, and can cause these electric apparatuses operate in an interlocking manner with a working machine.

The working machine that operates in an interlocking manner with the electric apparatus may be an electric working machine other than the circular saw 10, for example, may be a working machine driven by an engine or air motor, such as an engine cutter, and an air grinder. In either case, the working machine may be provided with a device for outputting the interlocking command signal at the time of operation.

The device for outputting the interlocking command signal may be the transmitter 42 for wireless signal transmission as in the aforementioned embodiments, or a device that outputs the interlocking command signal via a signal line (or wire).

Also, in the aforementioned embodiments, the mode setting is set via the operating device 82 operated by the user. The mode setting may be set using a mobile terminal, etc. of the user.

Reference Example

In the aforementioned embodiments and the variations, the load current is supplied to the resistive load 62, and the electric apparatus is operated in an interlocking manner with the working machine. However, as shown in FIG. 17 or 18, the electric load to which the load current is supplied may include a capacitive load 58 including a capacitor.

More specifically, the interlocking adapter 50 may be provided with the capacitive load 58 in an input path of the AC voltage from the AC plug 52, and configured to supply an AC current to the capacitive load 58 in response to the switching part 64 turned on.

In the interlocking adapter 50 configured as such, since the AC current (reactive current) having a phase advanced by 90° with respect to the AC voltage flows through the capacitive load 58, loss in the electric apparatus can be reduced. Therefore, occurrence of problems such as heat generation deriving from the load current can be inhibited, and eventually the interlocking adapter 50 can be downsized.

Figure 17:
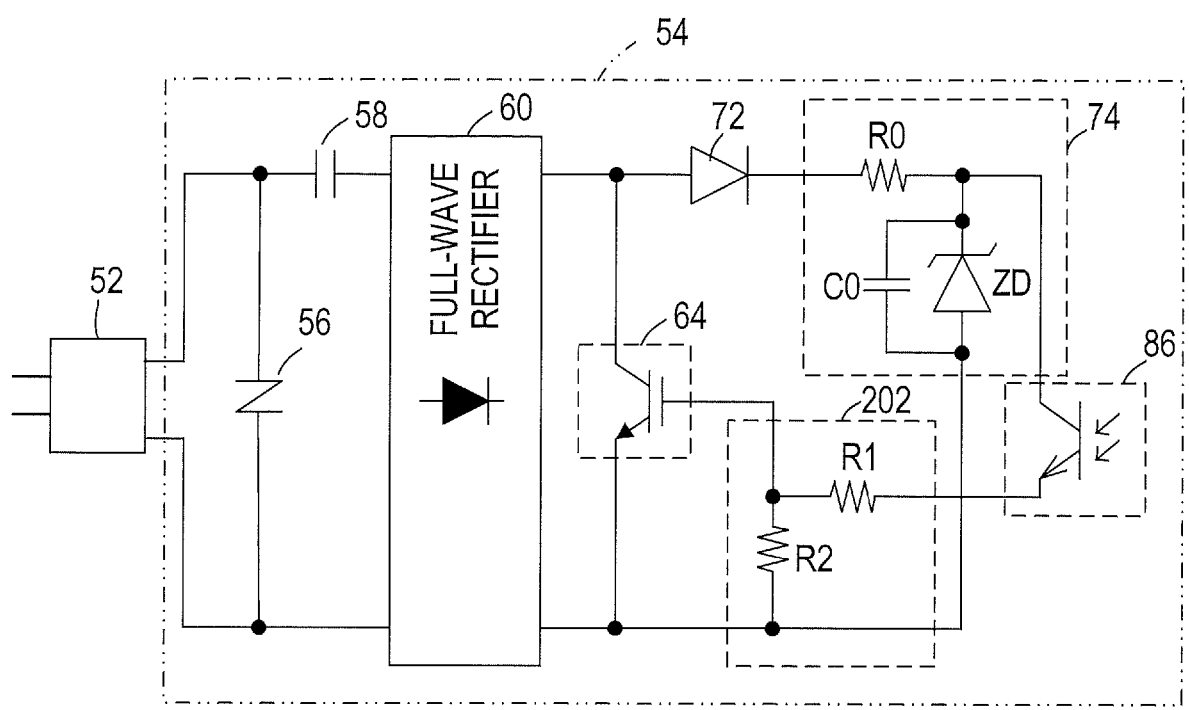
FIG. 17 is a circuit diagram showing a configuration of an interlocking adapter of a reference example.
Figure 18:
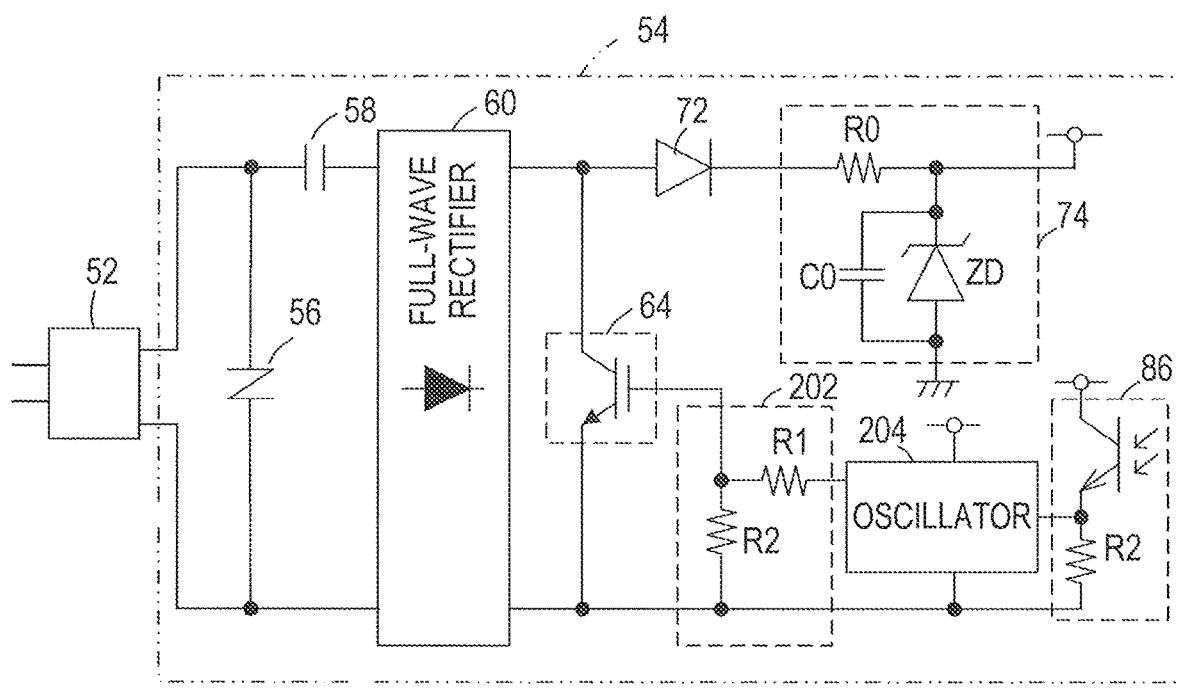
FIG. 18 is a circuit diagram showing a variation of the interlocking adapter shown in FIG. 17.

In the interlocking adapter 50 shown in FIG. 17, the switching part 64 is provided at the output stage of the full-wave rectifier 60. The interlocking command signal from the receiver 80 is received by the reception input device 86 including the light receiving device.

When the light receiving device of the reception input device 86 becomes the on-state at the time of receiving the interlocking command signal, a DC voltage supplied from the control power supply 74 is applied to a bias circuit 202 coupled to the gate of the switching part 64 so as to turn on the switching part 64, and the load current is supplied to the capacitive load 58.

The bias circuit 202 may be provided with a voltage dividing circuit formed with a resistor R1 and a resistor R2. The control power supply 74 may be provided with a Zener diode ZD. The control power supply 74 may further include a resistor R0 through which a breakdown current flows to the Zener diode ZD by applying a reverse bias voltage from the diode 72 to the Zener diode ZD. The control power supply 74 may further include a capacitor C0 that stabilizes a power supply voltage generated by the breakdown current flowing through the Zener diode ZD.

Utilizing the capacitive load such as a capacitor as the electric load, the configuration of the interlocking adapter 50 can be extremely simplified.

The interlocking adapter 50 shown in FIG. 18 is provided with an oscillator 204, and a resistor R2 that converts a light receiving current flowing through the light receiving device of the reception input device 86 into a voltage, in addition to the configuration of the interlocking adapter 50 shown in FIG. 17.

According to the interlocking adapter 50 configured as such, setting an oscillation frequency of the oscillator 204 to a frequency higher than the frequency of the AC voltage can turn on and off the switching part 64 twice or more at each cycle of the AC voltage at an output from the oscillator 204.

Therefore, it is possible to shorten the supply period of the load current via the capacitance load 58 and supply the load current with lower loss.

A plurality of functions of one component in the aforementioned embodiments or variations may be achieved by a plurality of components, and a single function of one component may be achieved by a plurality of components. Also, a plurality of functions of a plurality of components may be achieved by one component, and a single function achieved by a plurality of components may be achieved by one component. Further, some of the configuration of the aforementioned embodiments may be omitted. At least part of the configuration of any of the aforementioned embodiments may be added to or replaced with the configuration of the other of the embodiments. Any aspects included in the technical idea specified from language as set forth in the appended claims are embodiments of the present disclosure.

What is claimed is:

1. An interlocking adapter comprising:
a plug configured to be plugged into an electric outlet in an electric apparatus;
a first input path and a second input path configured to receive an alternating-current voltage from the plug;
a capacitive load on the first input path;
a full-wave rectifier including a first alternating-current input, a second alternating-current input, a first direct-current output, and a second direct-current output, the first alternating-current input being coupled to the first input path through the capacitive load, the second alternating-current input being coupled to the second input path, and the full-wave rectifier being configured (i) to rectify a full wave of the alternating-current voltage received via the first alternating-current input and the second alternating-current input and (ii) to thereby generate a rectified voltage between the first direct-current output and the second direct-current output;
a switch electrically coupled to the first direct-current output and to the second direct-current output, the switch being configured to be switched between an on-state and an off-state, the switch in the on-state being configured to complete a current flow path between the first direct-current output and the second direct-current output through the switch, and the switch in the off-state being configured to interrupt the current flow path; and
a reception input circuit configured to receive an interlocking command signal via a receiver, the interlocking command signal being wirelessly transmitted from a working machine, the receiver being configured (i) to wirelessly receive the interlocking command signal and (ii) to convert the interlocking command signal received, into light, the reception input circuit including a light receiving device configured (i) to be applied with a direct-current voltage and (ii) to receive the light to thereby turn on, and the reception input circuit being configured to turn on the switch in response to the light receiving device turning on or having turned on.

2. The interlocking adapter according to claim 1, further comprising:
a driving voltage generation circuit configured to generate a driving voltage to turn on the switch,
wherein the reception input circuit is coupled to the switch via the driving voltage generation circuit.

3. The interlocking adapter according to claim 2, wherein the driving voltage generation circuit includes a voltage dividing circuit.

4. The interlocking adapter according to claim 1, wherein the first direct-current output is configured to output a rectified positive voltage, further comprising:
a control power supply coupled to the first direct-current output, the control power supply being configured to generate a constant direct-current voltage to turn on the switch based on the rectified positive voltage.

5. The interlocking adapter according to claim 4, wherein the control power supply includes a capacitor and a Zener diode coupled in parallel with one another.

6. The interlocking adapter according to claim 4, further comprising a diode having an anode and a cathode, the anode being coupled to the first direct-current output, and the cathode being coupled to the control power supply.

7. The interlocking adapter according to claim 1, further comprising a surge absorber coupled between the first input path and the second input path.

8. The interlocking adapter according to claim 7, wherein the surge absorber includes a varistor.

9. The interlocking adapter according to claim 1, wherein the electric apparatus includes a dust collector.

10. The interlocking adapter according to claim 1, wherein the light receiving device is a unidirectional switch.

11. The interlocking adapter according to claim 10, wherein the light receiving device is a phototransistor.

12. The interlocking adapter according to claim 1, wherein the first direct-current output is configured to output a rectified positive voltage, further comprising:
a control power supply coupled to the first direct-current output, the control power supply being configured to generate, based on the rectified positive voltage, the direct-current voltage to be applied to the light receiving device.

13. An interlocking adapter comprising:
a plug configured to be plugged into an electric outlet in an electric apparatus;
a first input path and a second input path configured to receive an alternating-current voltage from the plug;
a capacitive load on the first input path;
a full-wave rectifier including a first alternating-current input, a second alternating-current input, a first direct-current output, and a second direct-current output, the first alternating-current input being coupled to the first input path through the capacitive load, the second alternating-current input being coupled to the second input path, and the full-wave rectifier being configured (i) to rectify a full wave of the alternating-current voltage received via the first alternating-current input and the second alternating-current input and (ii) to thereby generate a rectified voltage between the first direct-current output and the second direct-current output;
a switch electrically coupled to the first direct-current output and to the second direct-current output, the switch being configured to be switched between an on-state and an off-state, the switch in the on-state being configured to complete a current flow path between the first direct-current output and the second direct-current output through the switch, and the switch in the off-state being configured to interrupt the current flow path; and
a reception input circuit configured to receive an interlocking command signal transmitted from a working machine, the reception input circuit being configured to turn on the switch in response to the reception input circuit receiving the interlocking command signal; and
an oscillator having an oscillation frequency, the oscillator being coupled to the reception input circuit, and the oscillator being configured to turn on the switch based on the oscillation frequency.

14. The interlocking adapter according to claim 13, wherein the oscillation frequency is higher than a frequency of the alternating-current voltage.

15. The interlocking adapter according to claim 13, further comprising:
a driving voltage generation circuit configured to generate a driving voltage to turn on the switch,
wherein the oscillator is coupled to the switch via the driving voltage generation circuit.

16. The interlocking adapter according to claim 15, wherein the driving voltage generation circuit includes a voltage dividing circuit.

* * * * *